US012766630B2

(12) United States Patent

Seppaenen et al.

(10) Patent No.: US 12,766,630 B2
(45) Date of Patent: Oct. 20, 2026

(54) SONOTRODES FOR ULTRASONIC WELDING SYSTEMS, ULTRASONIC WELDING SYSTEMS, AND RELATED METHODS

(71) Applicant: Kulicke and Soffa Industries, Inc., Fort Washington, PA (US)

(72) Inventors: Henri Seppaenen, Irvine, CA (US); Tyler Ownby, Celina, TX (US)

(73) Assignee: Kulicke and Soffa Industries, Inc., Fort Washington, PA (US)

(*) Notice: Subject to any disclaimer, the term of this patent is extended or adjusted under 35 U.S.C. 154(b) by 0 days.

(21) Appl. No.: 19/264,128

(22) Filed: Jul. 9, 2025

(65) Prior Publication Data

US 2026/0014641 A1 Jan. 15, 2026

Related U.S. Application Data

(60) Provisional application No. 63/669,740, filed on Jul. 11, 2024.

(51) Int. Cl.
*B23K 20/10* (2006.01)

(52) U.S. Cl.
CPC .................................. *B23K 20/106* (2013.01)

(58) Field of Classification Search
CPC .. B23K 20/005; B23K 20/007; B23K 20/025; B23K 20/106
See application file for complete search history.

(56) References Cited

U.S. PATENT DOCUMENTS 3,464,102 A * 9/1969 Soloff ..................... B29C 65/08 156/580.2
3,676,911 A * 7/1972 Austin .................... H10P 72/78 29/559
3,695,502 A * 10/1972 Gaiser ................. H10P 72/0446 228/49.1
3,750,926 A * 8/1973 Sakamoto ......... B29C 66/81433 228/110.1
3,873,144 A * 3/1975 Diepeveen .......... H10P 72/0446 269/21

(Continued)

FOREIGN PATENT DOCUMENTS

JP 2011-110839 6/2011
JP 2013-038257 2/2013
WO 2024220203 10/2024

OTHER PUBLICATIONS

International Search Report for PCT application No. PCT/US2025/036952 completed on Nov. 14, 2025.

*Primary Examiner* — Keith Walker
*Assistant Examiner* — Carlos J Gamino
(74) *Attorney, Agent, or Firm* — Christopher M. Spletzer, Sr.

(57) ABSTRACT

A sonotrode configured for use in an ultrasonic welding system is provided. The sonotrode includes a body portion terminating at a tip portion, the tip portion includes (i) an alignment feature and (ii) a working surface configured to press against a base portion of a conductive pin during an ultrasonic welding process. The working surface defines an aperture configured to receive an elongate portion of the conductive pin. The alignment feature is configured to align the conductive pin with respect to the aperture.

21 Claims, 25 Drawing Sheets

(56) References Cited

U.S. PATENT DOCUMENTS

| | | | | | |
|---|---|---|---|---|---|
| 3,924,791 | A * | 12/1975 | Shimizu | B23K 20/10 968/156 |
| 3,938,722 | A * | 2/1976 | Kelly | H10P 72/0446 228/110.1 |
| 4,523,710 | A * | 6/1985 | Renshaw | B23K 20/10 411/111 |
| 4,589,586 | A * | 5/1986 | Polansky | B23K 20/106 279/3 |
| 4,667,870 | A * | 5/1987 | Avedissian | B23K 20/10 228/103 |
| 4,865,687 | A * | 9/1989 | Pierson | B29C 66/863 264/445 |
| 5,014,419 | A | 5/1991 | Cray et al. | |
| 5,249,450 | A * | 10/1993 | Wood | B21J 5/00 72/391.2 |
| 5,558,270 | A * | 9/1996 | Nachon | B23K 20/005 228/180.5 |
| 5,871,141 | A * | 2/1999 | Hadar | B23K 20/005 228/180.5 |
| 6,065,667 | A * | 5/2000 | Singh | B23K 20/005 228/180.5 |
| 6,189,760 | B1 * | 2/2001 | Gotoh | H10P 72/0446 228/49.1 |
| 6,213,378 | B1 * | 4/2001 | Singh | B23K 20/005 228/180.5 |
| 7,124,927 | B2 * | 10/2006 | Reiber | B23K 1/0016 228/6.1 |
| 10,882,134 | B2 | 1/2021 | Luechinger et al. | |
| 11,364,565 | B2 | 6/2022 | Luechinger et al. | |
| 11,850,676 | B2 | 12/2023 | Copperthite et al. | |
| 12,070,814 | B2 | 8/2024 | Copperthite et al. | |
| 2003/0062110 | A1 * | 4/2003 | Urlaub | B06B 3/02 156/73.1 |
| 2005/0218188 | A1 * | 10/2005 | Lee | B23K 20/005 228/4.5 |
| 2009/0126877 | A1 * | 5/2009 | Furuta | B30B 15/024 156/583.1 |
| 2011/0108959 | A1 | 5/2011 | Hembree | |
| 2015/0021376 | A1 * | 1/2015 | Uehling | B23K 20/005 228/180.5 |
| 2021/0379690 | A1 * | 12/2021 | Copperthite | B23K 20/002 |
| 2024/0091876 | A1 | 3/2024 | Copperthite et al. | |
| 2024/0351132 | A1 | 10/2024 | Sharma et al. | |
| 2024/0359255 | A1 | 10/2024 | Copperthite et al. | |
| 2024/0379613 | A1 * | 11/2024 | Munakata | H10W 72/0115 |
| 2025/0125303 | A1 * | 4/2025 | Ownby | H10W 72/0711 |
| 2025/0187103 | A1 | 6/2025 | Walker et al. | |
| 2025/0289074 | A1 * | 9/2025 | Walker | B23K 20/106 |

* cited by examiner

SONOTRODES FOR ULTRASONIC WELDING SYSTEMS, ULTRASONIC WELDING SYSTEMS, AND RELATED METHODS

CROSS-REFERENCE TO RELATED APPLICATION

This application claims the benefit of U.S. Provisional Application No. 63/669,740 filed on Jul. 11, 2024, the content of which is incorporated herein by reference.

FIELD

The invention relates to ultrasonic welding, and more particularly, to improved sonotrodes for use in ultrasonic welding systems, such as ultrasonic welding systems for conductive pin welding.

BACKGROUND

Ultrasonic welding is a technology used for joining conductive components. Ultrasonic welding may use an ultrasonic converter (e.g., carrying a sonotrode) for converting electrical energy into mechanical movement/scrub (e.g., linear movement/scrub, torsional movement/scrub, etc.). U.S. Pat. Nos. 10,882,134 and 11,364,565 (each entitled “ULTRASONIC WELDING SYSTEMS AND METHODS OF USING THE SAME”), assigned to Kulicke and Soffa Industries, Inc., relate to improvements in ultrasonic welding technology, and are incorporated by reference in their entirety.

A specific application of ultrasonic welding technology relates to ultrasonic pin welding (where such pins are conventionally solder and/or press fit into power modules). U.S. Pat. No. 11,850,676 (entitled “ULTRASONIC WELDING SYSTEMS, METHODS OF USING THE SAME, AND RELATED WORKPIECES INCLUDING WELDED CONDUCTIVE PINS”), U.S. Pat. No. 12,070,814 (entitled “ULTRASONIC WELDING SYSTEMS, METHODS OF USING THE SAME, AND RELATED WORKPIECES INCLUDING WELDED CONDUCTIVE PINS”), U.S. Patent Application Publication No. 2024/0359255 (entitled “ULTRASONIC WELDING SYSTEMS, METHODS OF USING THE SAME, AND RELATED WORKPIECES INCLUDING WELDED CONDUCTIVE PINS”), U.S. Patent Application Publication No. 2024/0351132 (entitled “ULTRASONIC WELDING SYSTEMS FOR CONDUCTIVE PINS, AND RELATED METHODS”), International Patent Publication No. WO2024/0220203 (entitled “ULTRASONIC WELDING SYSTEMS, SONOTRODES AND CONDUCTIVE PINS FOR SUCH SYSTEMS, AND RELATED METHODS AND WORKPIECES”), and U.S. Patent Application Publication No. 2025/0187103 (entitled “CONDUCTIVE PINS, POWER MODULES, ULTRASONIC WELDING SYSTEMS, AND METHODS OF USING THE SAME”), each assigned to Kulicke and Soffa Industries, Inc., relate to improvements in ultrasonic welding technology related to conductive pins, and are also incorporated by reference in their entirety.

In practice, a sonotrode may be used to pick up a conductive pin prior to ultrasonic welding of the conductive pin to a workpiece. During pick up and/or ultrasonic welding, a conductive pin may be misaligned with respect to the sonotrode. Further, in ultrasonic pin welding, unwelded material of conductive pins may form undesired “whiskers” (e.g., long strands of unwelded material), where such whiskers may result in short circuiting in a workpiece.

Thus, it would be desirable to provide improved sonotrodes, and ultrasonic welding systems including such sonotrodes, configured for use in connection with ultrasonic pin welding.

SUMMARY

According to an exemplary embodiment of the invention, a sonotrode configured for use in an ultrasonic welding system is provided. The sonotrode includes a body portion terminating at a tip portion, the tip portion including (i) an alignment feature and (ii) a working surface configured to press against a base portion of a conductive pin during an ultrasonic welding process. The working surface defines an aperture configured to receive an elongate portion of the conductive pin, the alignment feature being configured to align the conductive pin with respect to the aperture.

According to another exemplary embodiment of the invention, an ultrasonic welding system is provided. The ultrasonic welding system includes a support structure configured for supporting a workpiece and a weld head assembly. The weld head assembly includes an ultrasonic converter carrying a sonotrode configured for use in the ultrasonic welding system, the sonotrode including a body portion terminating at a tip portion. The tip portion includes an alignment feature and a working surface configured to press against a base portion of a conductive pin during an ultrasonic welding process, the working surface defining an aperture configured to receive an elongate portion of the conductive pin, the alignment feature being configured to align the conductive pin with respect to the aperture.

According to other embodiments of the invention, the sonotrode and/or the ultrasonic welding system recited in the two immediately preceding paragraphs may have any one or more of the following features: the alignment feature is a tapered surface of the tip portion extending toward the working surface; the alignment feature includes a plurality of tapered portions extending toward the working surface; depressions are defined between the plurality of tapered portions; the plurality of tapered portions extend above a planar surface of the tip portion; the planar surface is continuous with the working surface; the tip portion defines an outer portion between the alignment feature and an outer edge of the tip portion, the outer portion including (i) a plurality of outer protrusions and (ii) depressions between ones of the plurality of outer protrusions; ones of the plurality of tapered portions are integrated with ones of the plurality of outer protrusions; the plurality of tapered portions and the plurality of outer protrusions extend above a planar surface of the tip portion; the planar surface is continuous with the working surface; the alignment feature is a curved surface of the tip portion extending toward the working surface; the alignment feature includes a plurality of curved portions extending toward the working surface; depressions are defined between the plurality of curved portions; a plurality of protrusions extend from a planar portion of the working surface; the plurality of protrusions are arranged radially between the aperture and the alignment feature; ones of the plurality of protrusions are offset from adjacent ones of the plurality of protrusions; a plurality of grooves are defined by a planar portion of the working surface; the plurality of grooves are arranged radially between the aperture and the alignment feature; ones of the plurality of grooves are offset from adjacent ones of the plurality of grooves; the alignment feature is configured to contact the base portion of the conductive pin when the conductive pin is picked up by the sonotrode, and then the alignment feature aligns the conductive pin with respect to the aperture, and then the working surface contacts the base portion of the conductive pin during the ultrasonic welding process; the conductive pin is picked up by the sonotrode using a vacuum source, and wherein the vacuum source assists in aligning of the conductive pin with respect to the aperture; the alignment feature is configured to center the conductive pin with respect to the aperture during alignment; the tip portion defines an outer portion between the alignment feature and an edge of the tip portion, the outer portion including (i) a plurality of outer protrusions and (ii) depressions between ones of the plurality of outer protrusions; the plurality of outer protrusions extend above a planar surface of the tip portion; and the planar surface is continuous with the working surface.

According to another exemplary embodiment of the invention, a method of operating an ultrasonic welding system is provided. The method includes the steps of (a) providing a conductive pin to a sonotrode of the ultrasonic welding system, the sonotrode including a body portion terminating at a tip portion, the tip portion including (i) an alignment feature and (ii) a working surface configured to press against a base portion of the conductive pin during an ultrasonic welding process; and (b) aligning the conductive pin with respect to an aperture defined by the sonotrode using the alignment feature.

According to other embodiments of the invention, the method of operating an ultrasonic welding system recited in the immediately preceding paragraph may have any one or more of the following features: step (a) includes picking up the conductive pin using the sonotrode; the sonotrode picks up the conductive pin using a vacuum source; step (b) includes using a vacuum source coupled to the sonotrode, wherein the vacuum source assists in the aligning of the conductive pin with respect to the aperture; the alignment feature is a tapered surface of the tip portion extending toward the working surface; depressions are defined between the plurality of tapered portions; the plurality of tapered portions extend above a planar surface of the tip portion; the planar surface is continuous with the working surface; the tip portion defines an outer portion between the alignment feature and an outer edge of the tip portion, the outer portion including (i) a plurality of outer protrusions and (ii) depressions between ones of the plurality of outer protrusions; ones of the plurality of tapered portions are integrated with ones of the plurality of outer protrusions; the plurality of tapered portions and the plurality of outer protrusions extend above a planar surface of the tip portion; the planar surface is continuous with the working surface; the alignment feature is a curved surface of the tip portion extending toward the working surface; the alignment feature includes a plurality of curved portions extending toward the working surface; depressions are defined between the plurality of curved portions; a plurality of protrusions extend from a planar portion of the working surface; the plurality of protrusions are arranged radially between the aperture of the sonotrode and the alignment feature, the aperture being configured to receive an elongate portion of the conductive pin; a plurality of grooves are defined by a planar portion of the working surface; the plurality of grooves are arranged radially between the aperture of the sonotrode and the alignment feature, the aperture being configured to receive an elongate portion of the conductive pin; ones of the plurality of grooves are offset from adjacent ones of the plurality of grooves; the alignment feature is configured to contact the base portion of the conductive pin during step (a); the alignment feature is configured to center the conductive pin with respect to the aperture of the sonotrode during step (b), wherein the aperture is configured to receive an elongate portion of the conductive pin; further comprising step (c) ultrasonically welding the conductive pin to a workpiece after step (b); step (c) includes contacting the base portion of the conductive pin with the working surface during the ultrasonic welding; step (c) includes using torsional welding for ultrasonically welding the conductive pin to the workpiece; the tip portion defines an outer portion between the alignment feature and an edge of the tip portion, the outer portion including (i) a plurality of outer protrusions and (ii) depressions between ones of the plurality of outer protrusions; the plurality of outer protrusions extend above a planar surface of the tip portion; and the planar surface is continuous with the working surface.

BRIEF DESCRIPTION OF THE DRAWINGS

The invention is best understood from the following detailed description when read in connection with the accompanying drawings. It is emphasized that, according to common practice, the various features of the drawings are not to scale. On the contrary, the dimensions of the various features are arbitrarily expanded or reduced for clarity. Included in the drawings are the following figures.

DETAILED DESCRIPTION

According to exemplary embodiments of the invention, alignment features (e.g., conductive pin alignment features) are provided in a tip portion of a sonotrode. Such alignment features may be used to align a conductive pin in the center of the sonotrode while pin welding (e.g., torsional ultrasonic pin welding) is performed. Exemplary alignment features have an angled shape and a radial symmetry with the sonotrode center line.

An alignment feature may be designed to fit an exemplary conductive pin diameter. Alignment features within the scope of the invention may include structured shapes or patterns. Such structured shapes or patterns may help to deform a conductive pin while seated in the sonotrode. Such structured shapes or patterns may also increase friction and contact force between (i) a tip portion of the sonotrode and (ii) the conductive pin, which helps engagement between the conductive pin and the sonotrode, and helps welding during an ultrasonic welding process. Alignment features within the scope of the invention may provide easier alignment for standard flat head conductive pins.

As used herein, the term "conductive pin" is intended to refer to any conductive structure intended to be welded to a workpiece. The conductive pin may have a free end (after being welded to a workpiece), and a body portion of the conductive pin may extend substantially vertically from a "welded" end to the free end. The cross section of the conductive pin may be round, square, rectangular, or have any desired cross section. The term conductive pin shall also be construed to include conductive receptacles or sleeves (e.g., having a tubular shape such as a rivet), where the conductive receptacle/sleeve is ultrasonically welded to a workpiece, and configured to receive another conductive element.

Figure 1:
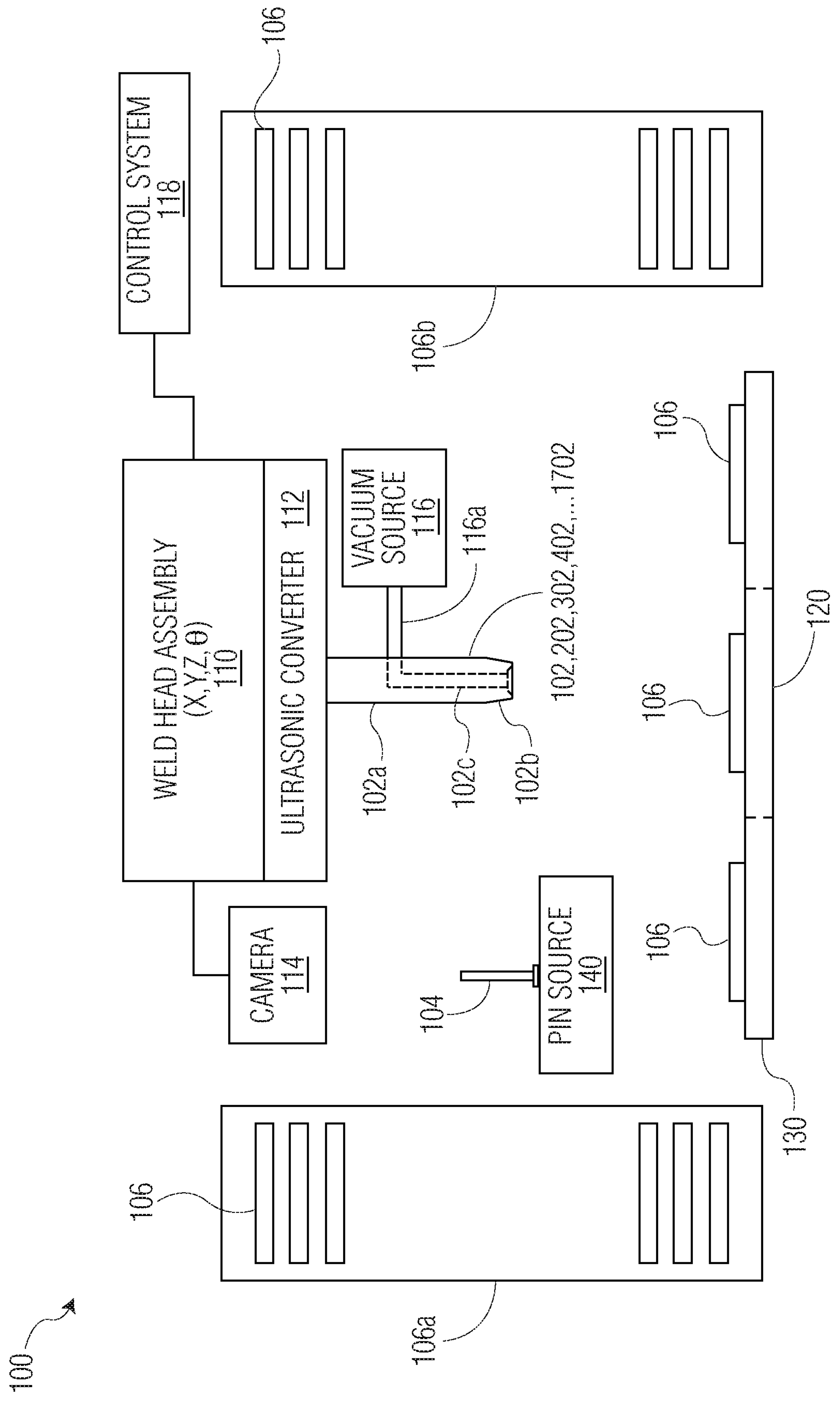
FIG. 1 is a block diagram side view of an ultrasonic welding system in accordance with an exemplary embodiment of the invention.

Referring now to FIG. 1, an ultrasonic welding system 100 is illustrated. Ultrasonic welding system 100 includes a weld head assembly 110, a control system 118, an input workpiece supply 106*a*, an output workpiece supply 106*b*, a support structure 120, a material handling system 130, and a pin source 140.

Weld head assembly 110 is configured to translate along an x-direction, y-direction, and z-direction, and to rotate in a θ-direction (e.g., wherein the θ direction is a rotation about the z-direction axis of weld head assembly 110). Weld head assembly 110 includes an ultrasonic converter 112 for generating ultrasonic motion during a welding operation (e.g., wherein the ultrasonic motion is torsional motion, wherein the ultrasonic motion is linear motion, etc.). Ultrasonic converter 112 is configured to receive a sonotrode 102, which performs the welding operation. Weld head assembly 110 includes a camera 114, for example, for locating a bonding location on a workpiece 106. Control system 118 is configured to control the motion of weld head assembly 110 (e.g., motion along the x-, y-, z-, and θ-directions), and/or to control ultrasonic converter 112 during welding operations.

Sonotrode 102 is configured to ultrasonically weld a conductive pin 104 to workpiece 106 during a welding operation. Sonotrode 102 could be any of the sonotrodes described herein (i.e., sonotrode 102, sonotrode 202, sonotrode 302, sonotrode 402, sonotrode 502, sonotrode 602, sonotrode 702, sonotrode 802, sonotrode 902, sonotrode 1002, sonotrode 1102, sonotrode 1202, sonotrode 1302, sonotrode 1402, sonotrode 1502, sonotrode 1602, or sonotrode 1702), or any other sonotrode falling within the scope of the invention (e.g., any combination of the sonotrode features described herein, any other sonotrodes described herein but not pictured, etc.). Sonotrode 102 includes a body portion 102*a* terminating at a tip portion 102*b*. Sonotrode 102 defines an aperture 102*c* configured to receive conductive pin 104. Sonotrode 102 may be configured to pick up conductive pin 104 via a vacuum source 116, though the invention is not so limited (e.g., sonotrode 102 may pick up conductive pin 104 via a gripper, electromagnetics, or any other conventional apparatus). Vacuum source 116 is connected to aperture 102*c* of sonotrode 102 via vacuum piping 116*a*. Tip portion 102*b* of sonotrode 102 includes a working surface 102*b*2 and an alignment feature 102*b*1, both of which will be described in greater detail herein.

Input workpiece supply 106*a* is configured to supply workpieces 106 to material handling system 130 prior to welding operations (e.g., from a workpiece magazine). Material handling system 130 provides workpieces to support structure 120, which supports workpieces 106 during welding operations. Material handling system 130 then moves processed workpieces 106 from support structure 120 to output workpiece supply 106*b*, which stores processed workpieces 106 (e.g., in an output workpiece magazine).

Pin source 140 provides conductive pins 104 for use by sonotrode 102 in connection with welding operations. Transfer of conductive pins 104 between pin source 140 and sonotrode 102 can be accomplished by any known process (e.g., vacuum transfer, etc.).

Figure 2B:
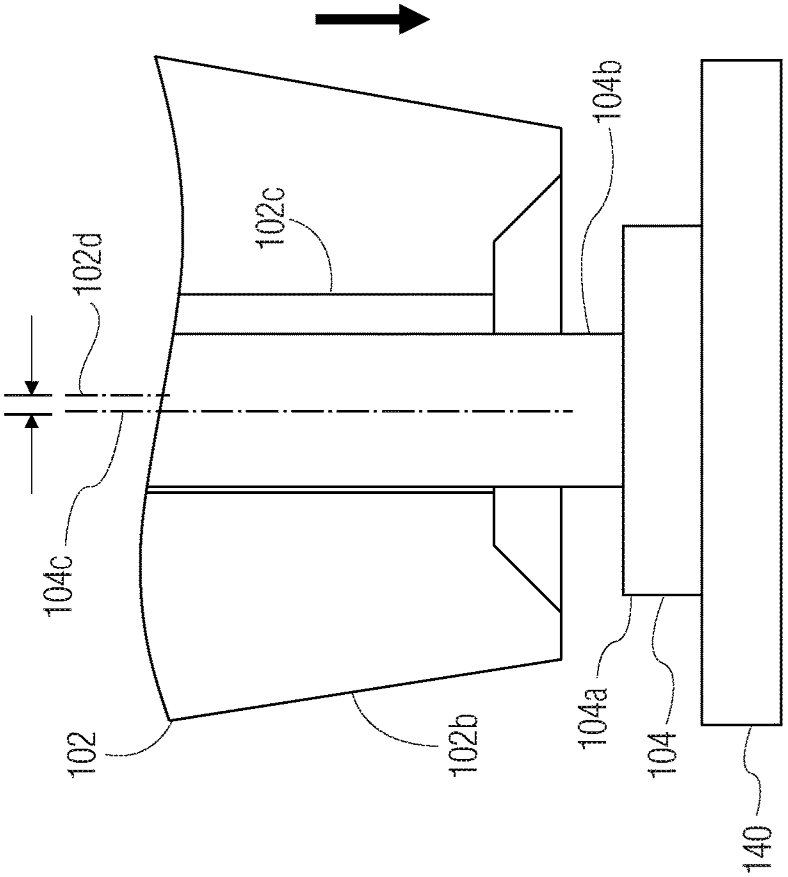
FIGS. 2A-2F are block diagram side views illustrating a process of operating an ultrasonic welding system in accordance with an exemplary embodiment of the invention.
Figure 2A:
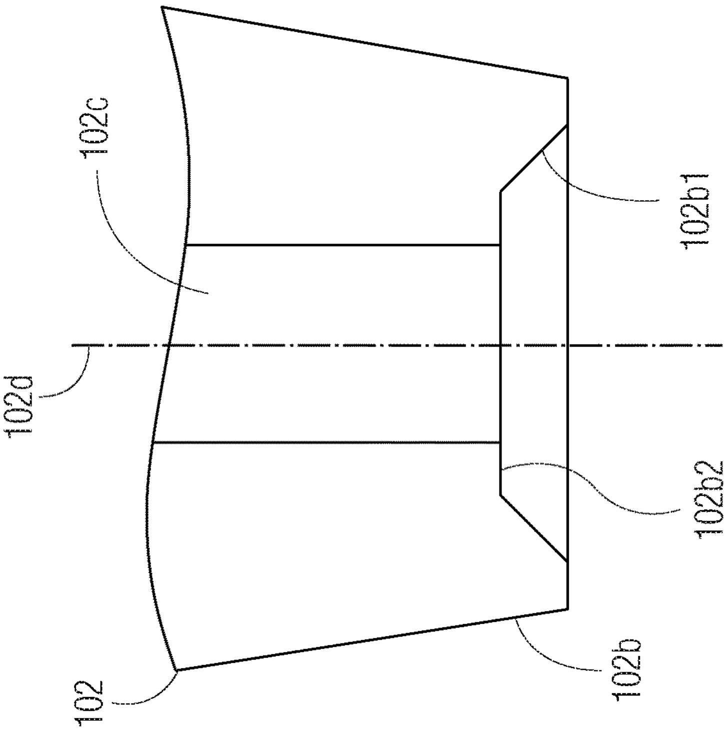

FIGS. 2A-2F illustrate tip portion 102*b* of sonotrode 102. Illustrated in FIG. 2A, sonotrode 102 includes aperture 102*c*, a working surface 102*b*2, and an alignment feature 102*b*1. A sonotrode centerline 102*d* is also illustrated. Aperture 102*c* is configured to receive an elongate portion 104*b* of conductive pin 104. In FIG. 2B, sonotrode 102 is descending to pick up conductive pin 104 from pin source 140. Conductive pin 104 includes a base portion 104*a* and elongate portion 104*b*. A conductive pin centerline 104*c* is offset from sonotrode centerline 102*d* (i.e., conductive pin 104 is not centered within sonotrode 102).

Figure 2C:
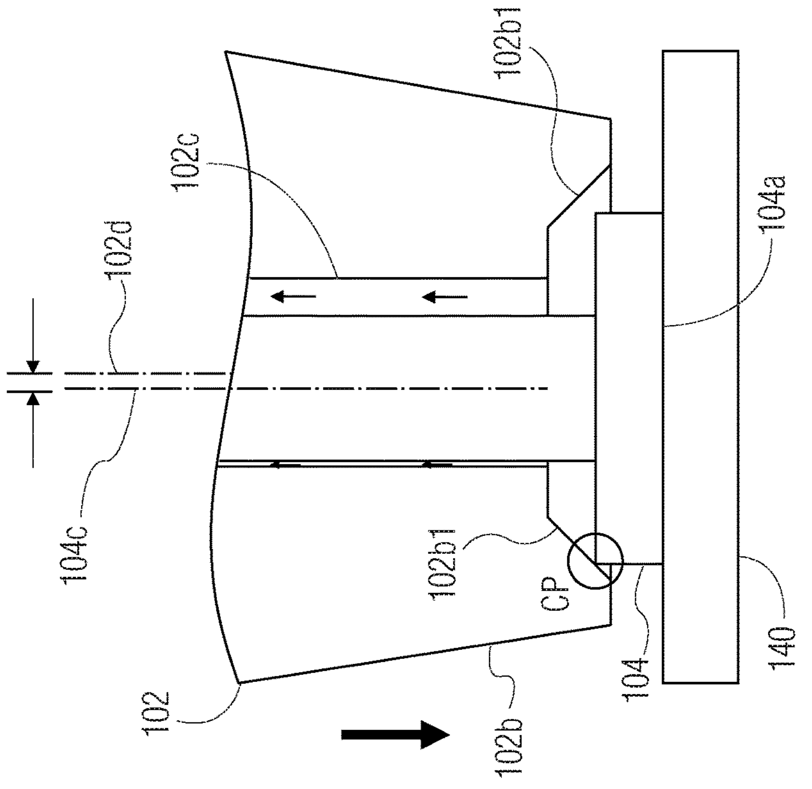
Figure 2D:
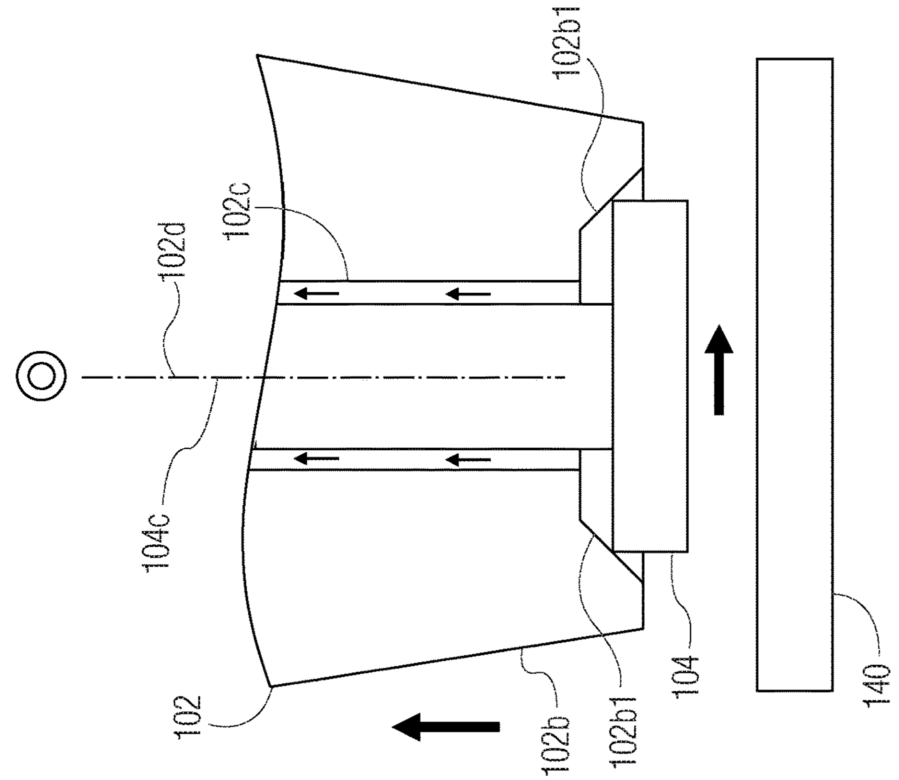

In FIG. 2C, sonotrode 102 has been lowered to engage conductive pin 104, and a vacuum is being drawn through aperture 102*c* (indicated by arrows in aperture 102*c*, wherein the vacuum is provided by, for example, vacuum source 116) to secure conductive pin 104 in sonotrode 102. As sonotrode 102 is lowered, an edge of base portion 104*a* is contacting one side of alignment feature 102*b*1, indicated by the circled portion CP. In FIG. 2D, sonotrode 102 has moved away from pin source 140 with a vacuum continuing to be drawn through aperture 102*c*. Alignment feature 102*b*1 has aligned conductive pin 104 with respect to aperture 102*c*, thus sonotrode centerline 102*d* and conductive pin centerline 104*c* are coincident. In the illustrated embodiment, the vacuum drawn through aperture 102*c* has pulled base portion 104*a* along alignment feature 102*b*1 until base portion 104*a* was properly aligned, in this case, centered within sonotrode 102.

Figure 2F:
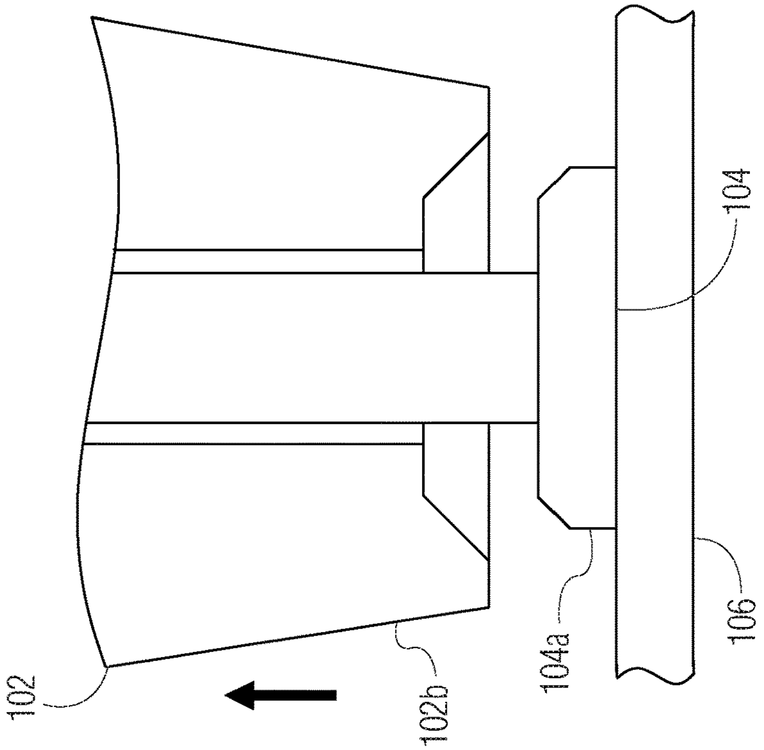
Figure 2E:
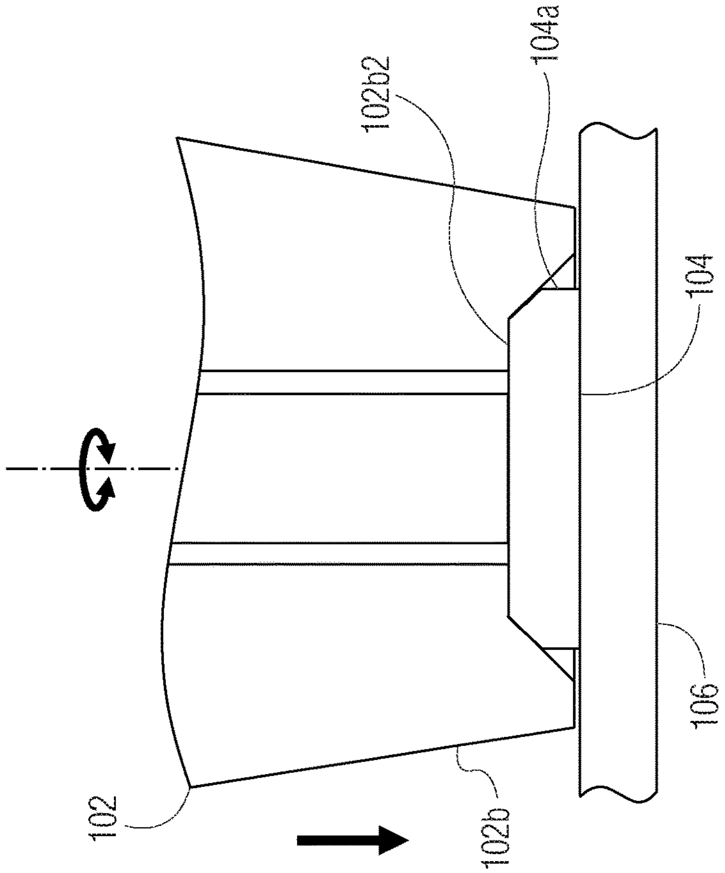

FIG. 2E illustrates sonotrode 102 ultrasonically welding conductive pin 104 to workpiece 106. Sonotrode 102 is pressing against base portion 104*a* with working surface 102*b*2 and vibrating ultrasonically (e.g., using torsional motion). In FIG. 2F, conductive pin 104 has been ultrasonically welded to workpiece 106, and sonotrode 102 is moving away from workpiece 106. In this example, the edge of base portion 104*a* (i.e., an upper edge which was in contact with alignment feature 102*b*1) has been deformed during welding.

Figure 3A:
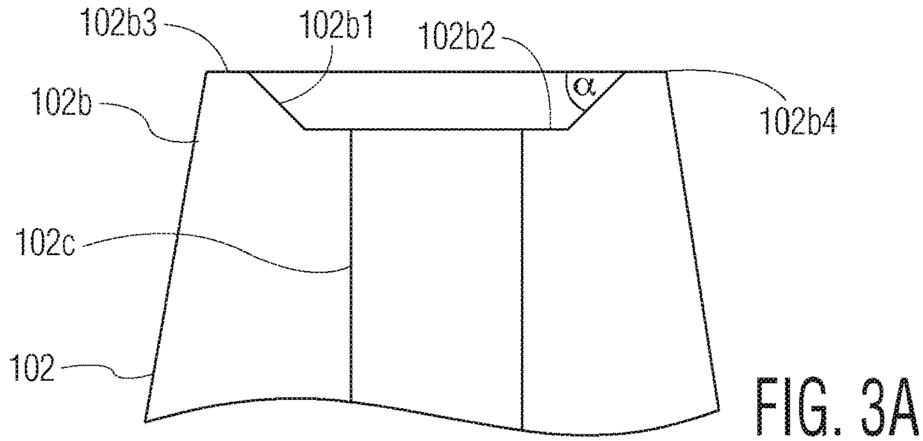
FIGS. 3A-3C, 4A-4C, 5A-5C, 6A-6C, 7A-7C, 8A-8C, 9A-9C, 10A-10C, 11A-11C, 12A-12C, 13A-13C, 14A-14C, 15A-15C, 16A-16D, 17A-17D, 18A-18D, and 19A-19D are various views of tip portions of sonotrodes in accordance with various exemplary embodiments of the invention.
Figure 3B:
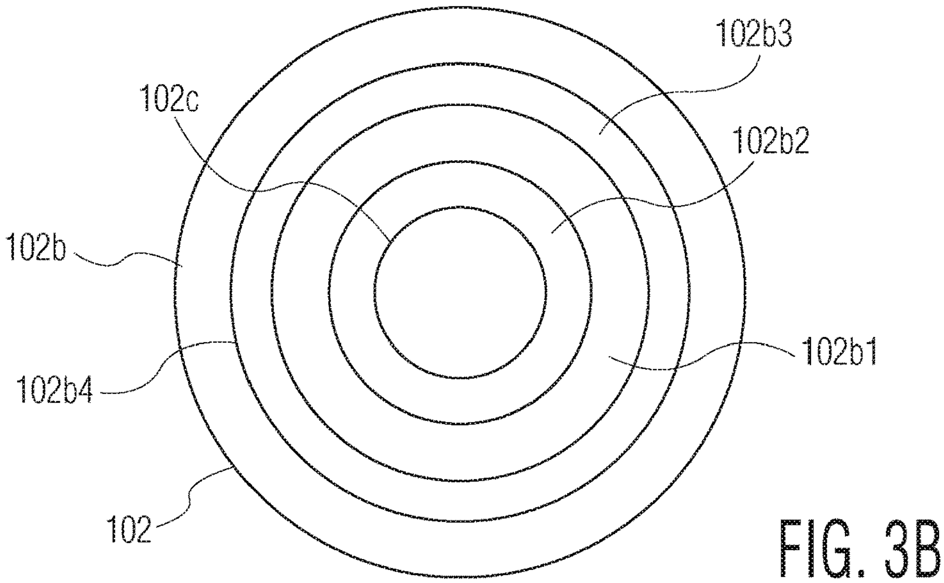
Figure 3C:
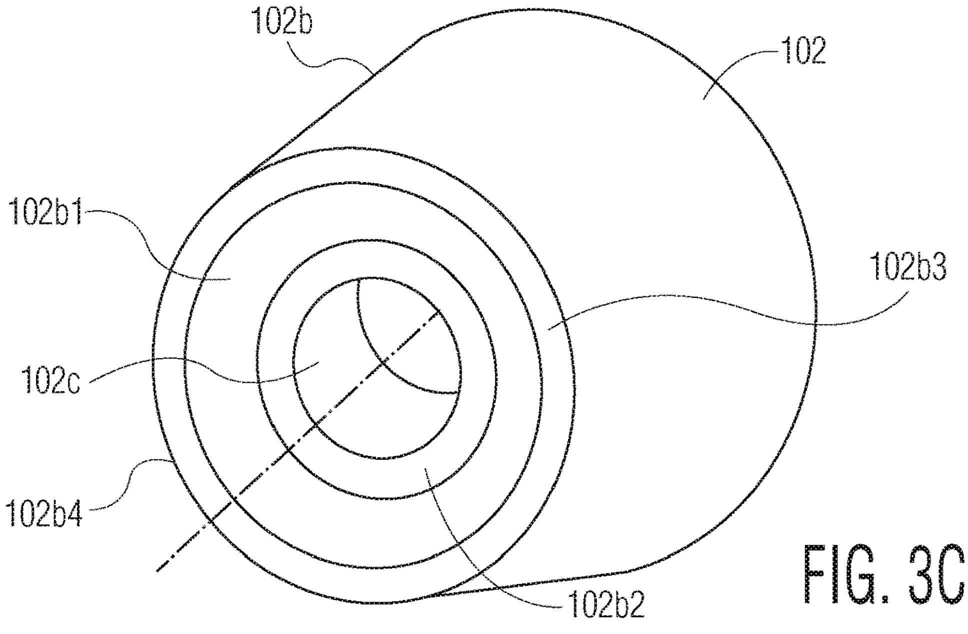

FIGS. 3A-3C illustrate tip portion 102*b* in additional detail. FIG. 3A illustrates a cross sectional side view of tip portion 102*b*. Alignment feature 102*b*1 is an annular tapered surface (e.g., a chamfer) extending toward working surface 102*b*2. An outer portion 102*b*3 extends between alignment feature 102*b*1 and an outer edge 102*b*4 of tip portion 102*b*. Alignment feature 102*b*1 is illustrated as an annulus having an angle ("α") of approximately 45° from working surface 102*b*2. Exemplary ranges for the angle are: 20°-70°; 30°-60°; and 40°-50°. Both alignment feature 102*b*1 and working surface 102*b*2 are smooth surfaces. FIG. 3B is a bottom view of tip portion 102*b* detailing the overall shape of tip portion 102*b*. FIG. 3C is a perspective view of tip portion 102*b* further detailing the shape and texture of alignment feature 102*b*1 and working surface 102*b*2.

Although FIGS. 1, 2A-2F, and 3A-3C illustrate tip portion 102*b* as having a particular geometry, the invention is not limited to such embodiments. Additional embodiments of the tip portion of the sonotrode are illustrated and described herein (e.g., various types of alignment features). Further, other exemplary features may improve engagement between the sonotrode and the conductive pin during welding or may otherwise provide improvements to the welding process such that less defects occur during welding.

Figure 4A:
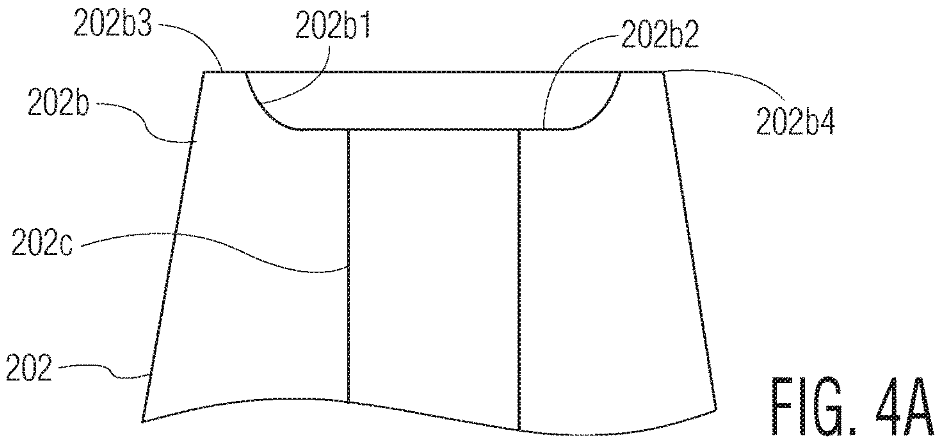
Figure 4B:
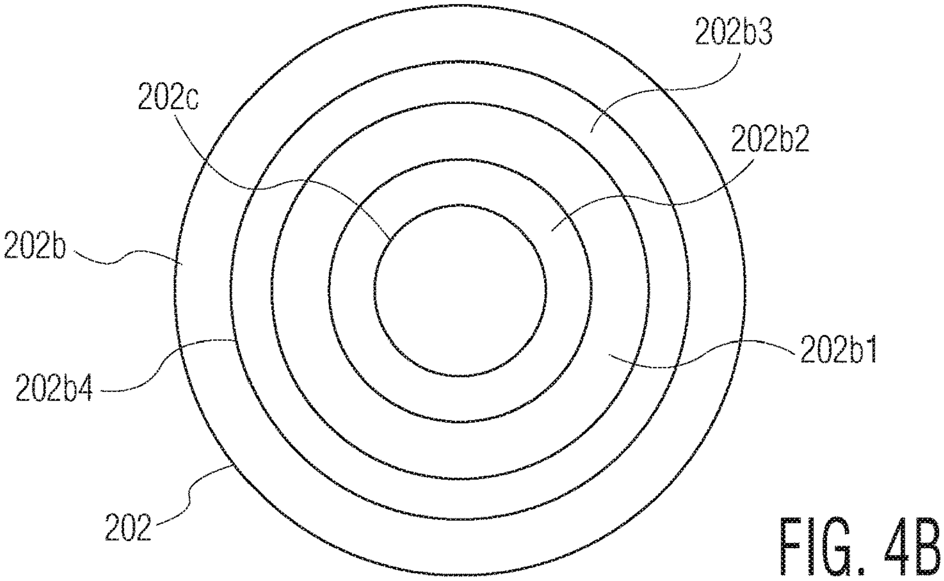
Figure 4C:
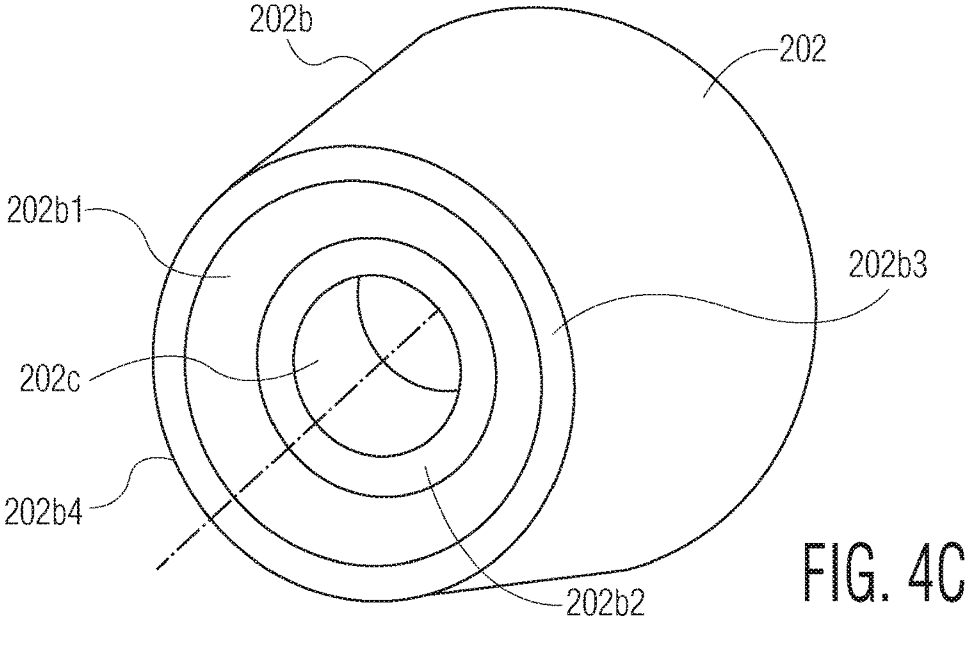

FIGS. 4A-4C illustrate a tip portion 202*b* of a sonotrode 202, which defines an aperture 202*c*. An alignment feature 202*b*1 has a concavely curved annular surface that extends between a working surface 202*b*2 and an outer portion 202*b*3. Outer portion extends between alignment feature 202*b*1 and an outer edge 202*b*4 of tip portion 202*b*. In the illustrated embodiment in FIGS. 4A-4C (and in the other exemplary sonotrodes illustrated herein), a working surface **202*b*2** is planar but is not limited thereto. It is contemplated that an alignment feature could include a convexly curved surface, or a curved surface with convex and concave surfaces, all within the scope of the invention.

The following embodiments illustrate and describe tip portions with an annular alignment feature including an angled surface rather than a curved surface for purposes of brevity. However, any embodiment described herein may include either an angled surface, a curved surface, or a combination of an angled surface and a curved surface, all within the scope of the invention. Further, each of FIGS. 5A, 6A, 7A, 8A, 9A, 10A, 11A, 12A, 13A, 14A, and 15A illustrate a simplified sectional view and may not match the actual configuration of the alignment feature—where the actual configuration is shown in the corresponding end and perspective end views (e.g., see FIGS. 5B-5C, FIGS. 6B-6C, FIGS. 7B-7C, FIGS. 8B-8C, FIGS. 9B-9C, FIGS. 10B-10C, FIGS. 11B-11C, FIGS. 12B-12C, FIGS. 13B-13C, FIGS. 14B-14C, FIGS. 15B-15C).

Figure 5A:
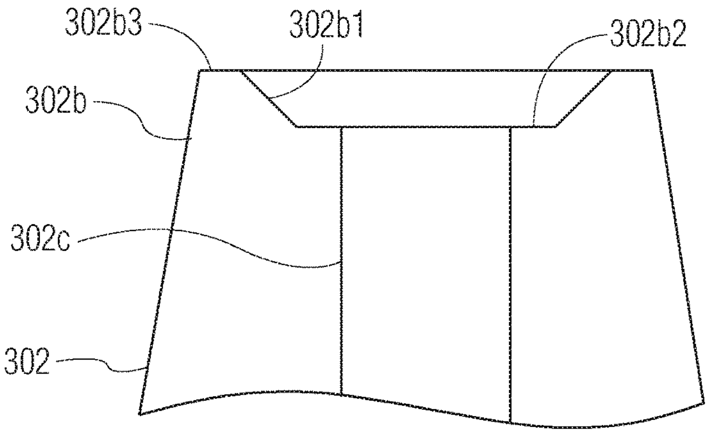
Figure 5B:
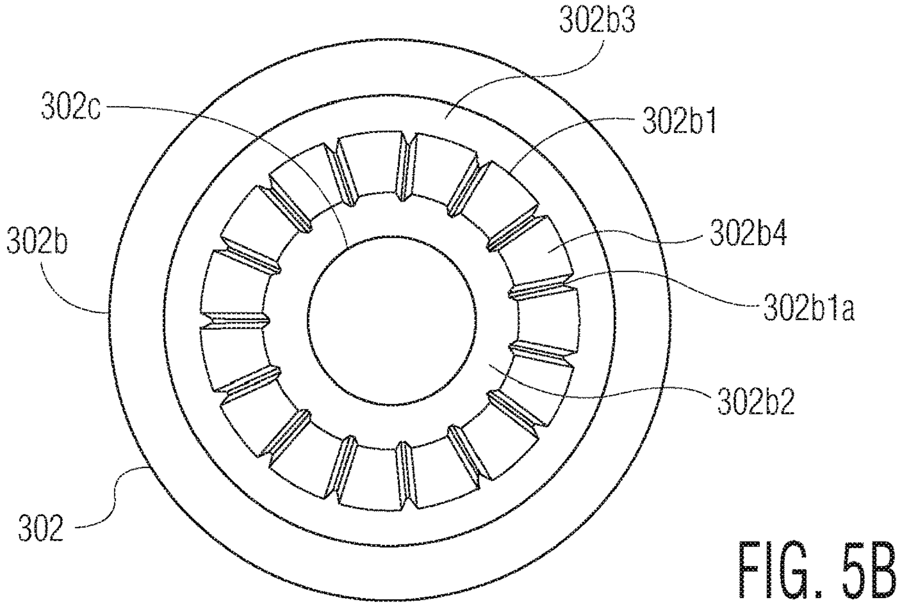
Figure 5C:
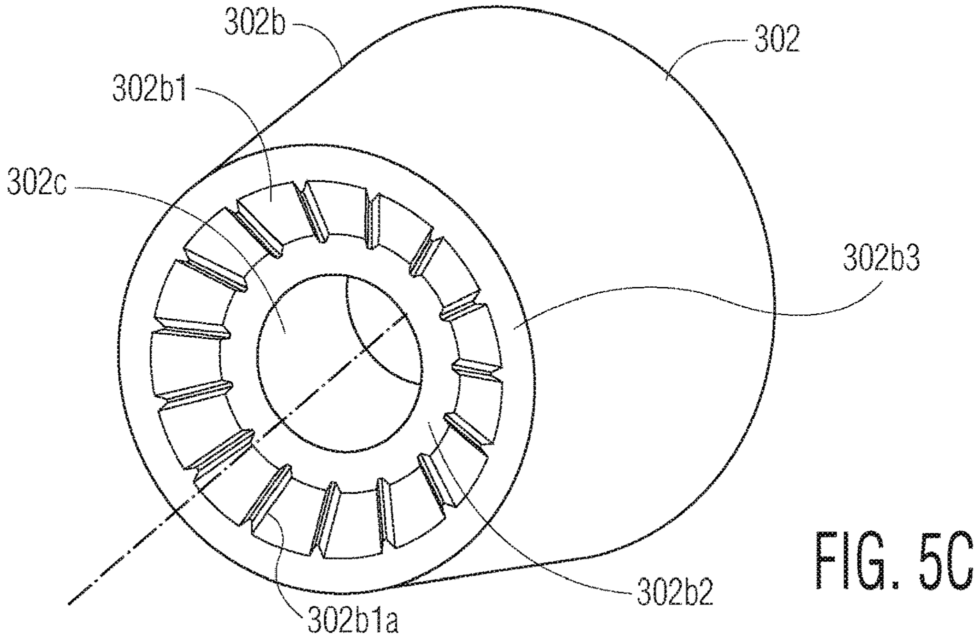

FIGS. 5A-5C illustrate a tip portion **302*b* of a sonotrode 302, which defines an aperture 302*c* and a working surface 302*b*2 (e.g., a planar working surface). An alignment feature 302*b*1 includes a plurality of protrusions 302*b*1*a* (e.g., tapered portions) arranged in a radial configuration/pattern around aperture 302*c*. A plurality of depressions 302*b*4 are defined between the plurality of protrusions 302*b*1*a*. It should be understood that depressions 302*b*4 are defined by a relative dimensional difference (e.g., a height difference) from the adjacent protrusions 302*b*1*a*. The tip portion 302*b* illustrated in FIGS. 5A-5C may be described as an embodiment where alignment feature 302*b*1 includes a plurality of tapered portions (i.e., fifteen regions of alignment feature 302*b*1) extending toward working surface 302*b*2**.

Figure 6A:
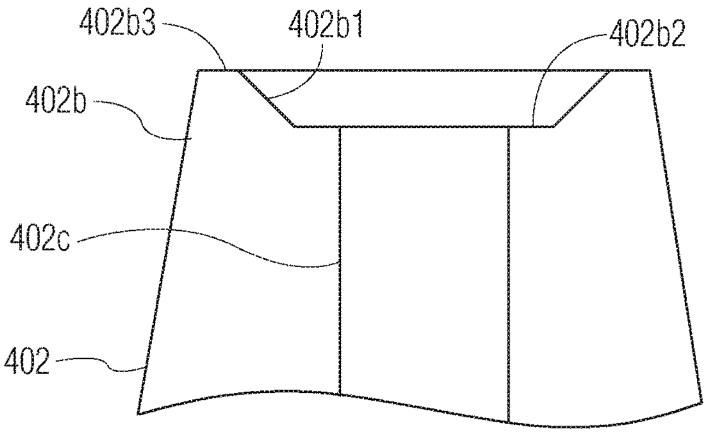
Figure 6B:
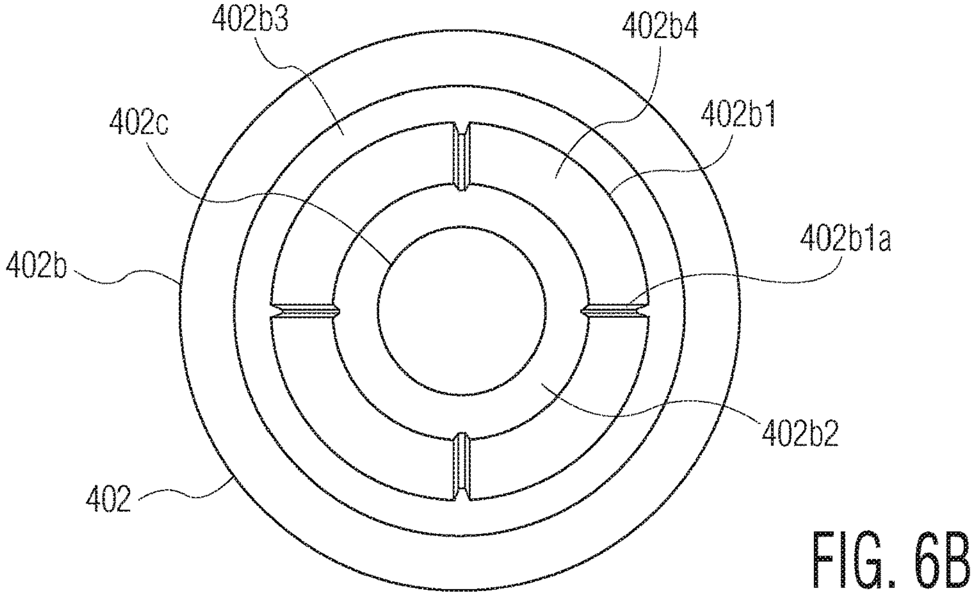
Figure 6C:
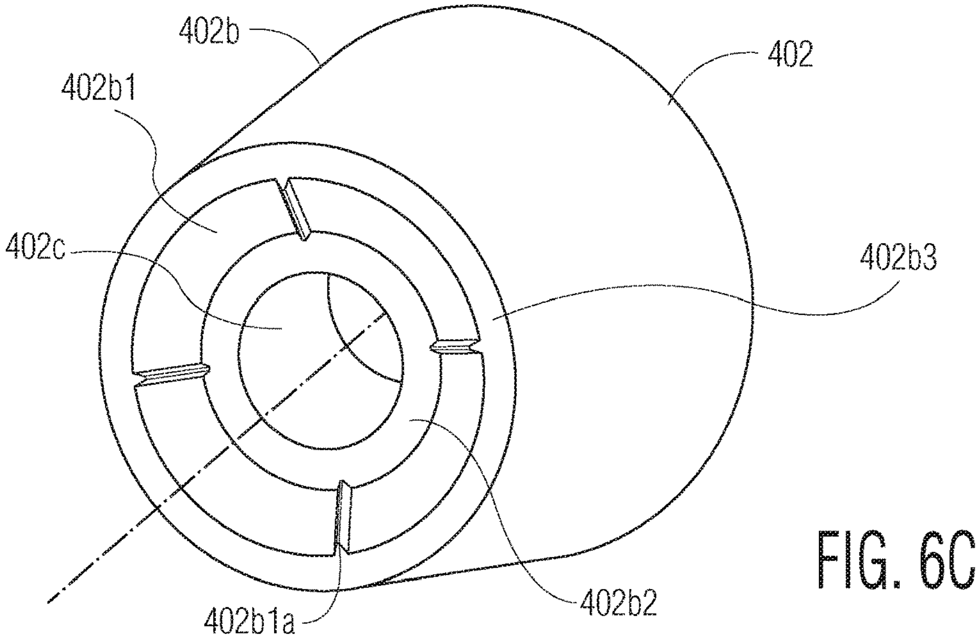

FIGS. 6A-6C illustrate a tip portion **402*b* of a sonotrode 402, which defines an aperture 402*c* and a working surface 402*b*2. An alignment feature 402*b*1 of sonotrode 402 includes a plurality of protrusions 402*b*1*a* that are similar to protrusions 302*b*1*a* (though fewer in number) as well as a plurality of depressions 402*b*4. It is contemplated that an alignment feature may include any number of protrusions (e.g., 5, 10, etc.), the protrusions having any shape, profile, or width, all within the scope of the invention. It is also contemplated that there could be multiple rows of protrusions. The tip portion 402*b* illustrated in FIGS. 6A-6C may be described as an embodiment where alignment feature 402*b*1 includes a plurality of tapered portions (i.e., four regions of alignment feature 402*b*1) extending toward working surface 402*b*2**.

Figure 7A:
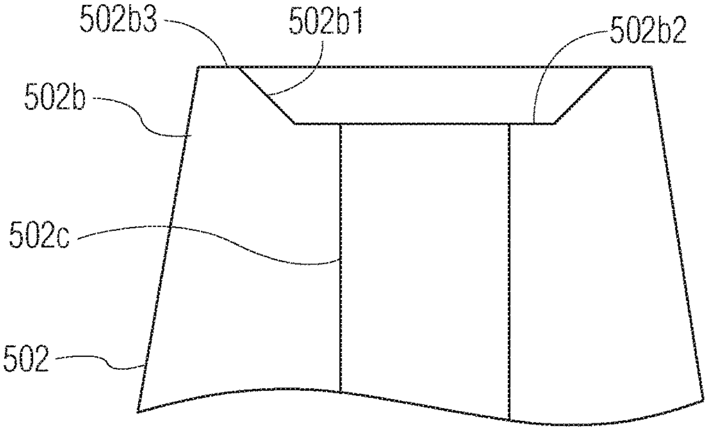
Figure 7B:
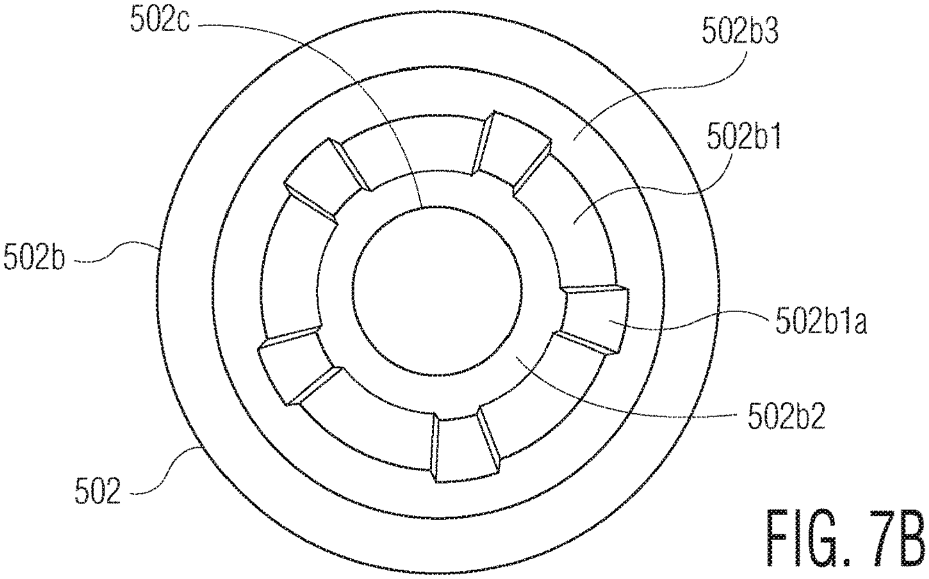
Figure 7C:
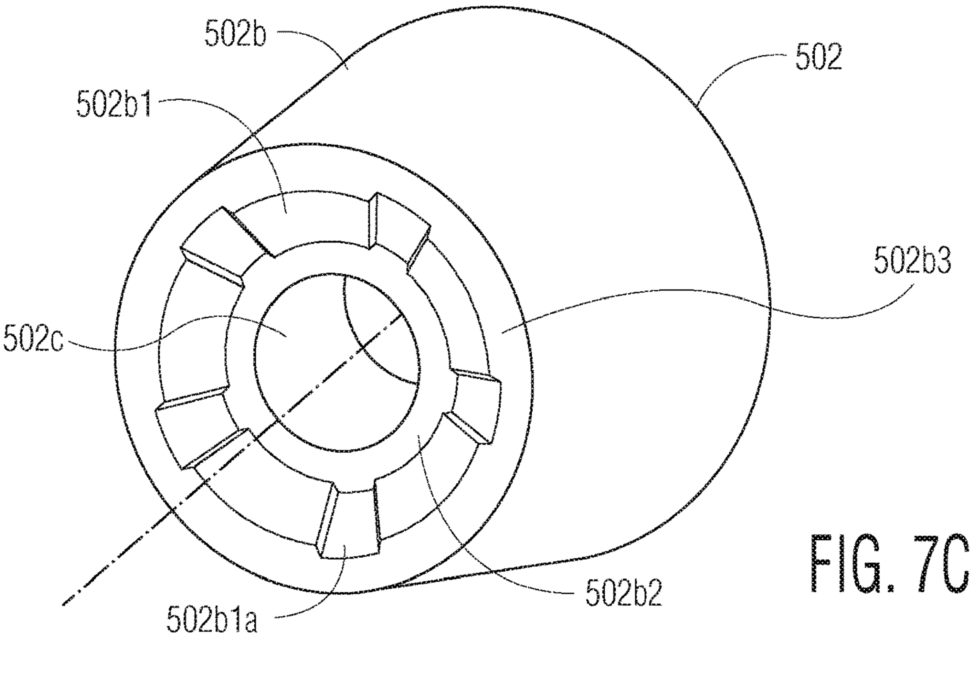

FIGS. 7A-7C illustrate a tip portion **502*b* of a sonotrode 502, which defines an aperture 502*c* and a working surface 502*b*2. An alignment feature 502*b*1 of sonotrode 502 includes a plurality of depressions 502*b*1*a*. Although the embodiment is illustrated with five depressions, the invention is not so limited, as it is contemplated that a sonotrode could have any number of depressions with any shape, width, or profile. It is also contemplated that there could be multiple rows of depressions. The tip portion 502*b* illustrated in FIGS. 7A-7C may be described as an embodiment where alignment feature 502*b*1 includes a plurality of tapered portions (i.e., five regions of alignment feature 502*b*1) extending toward working surface 502*b*2. In the illustrated embodiment, the plurality of depressions 502*b*1*a*** are defined between the plurality of tapered portions.

Figure 8A:
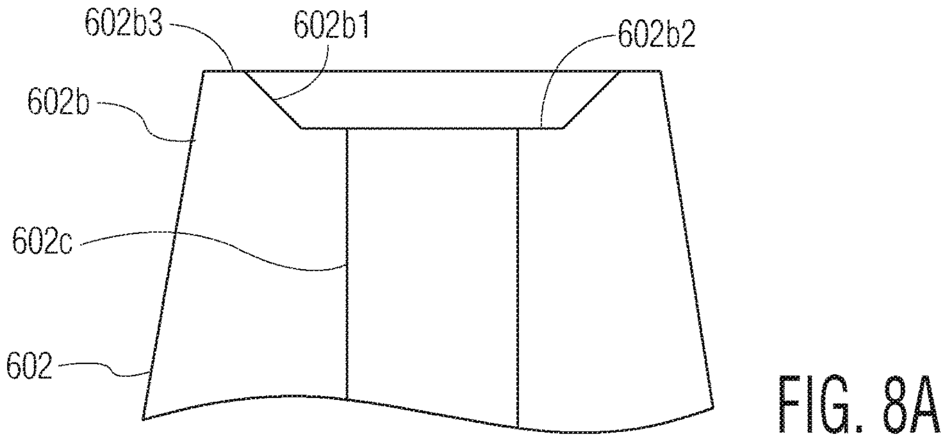
Figure 8B:
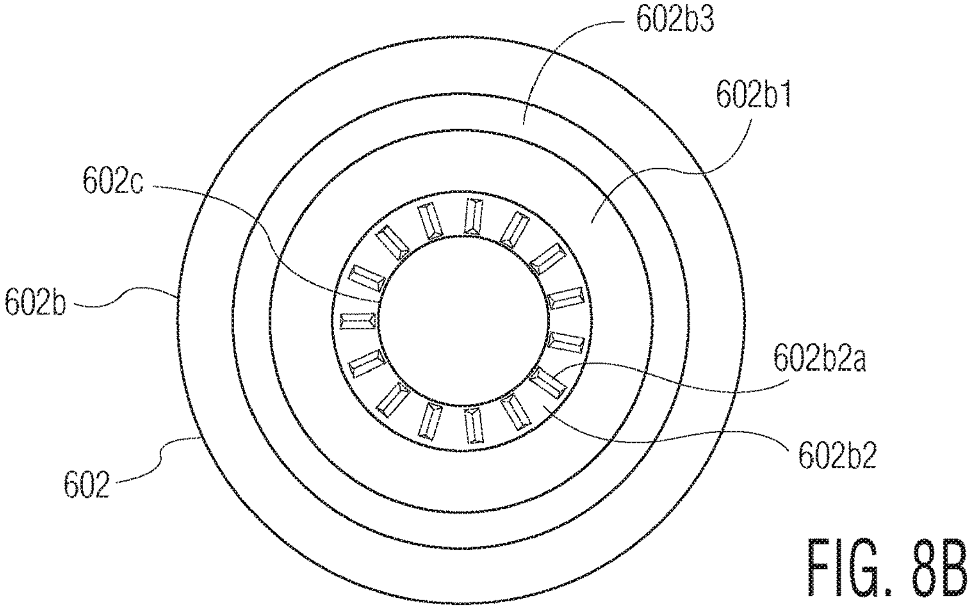
Figure 8C:
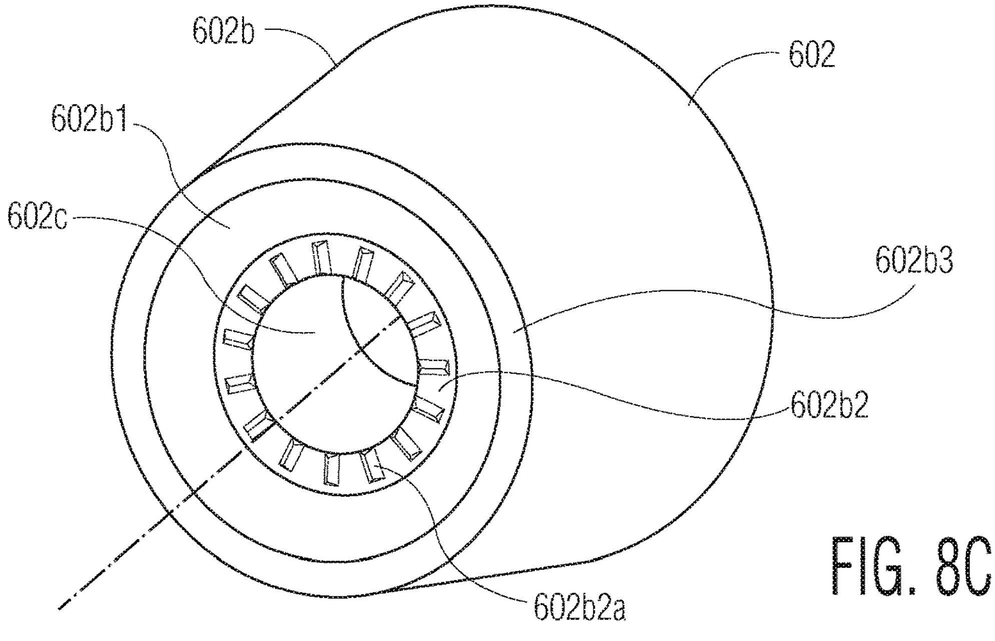
Figure 9A:
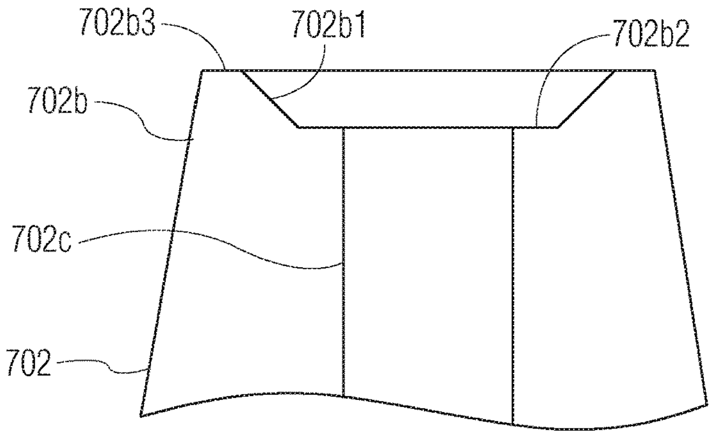
Figure 9B:
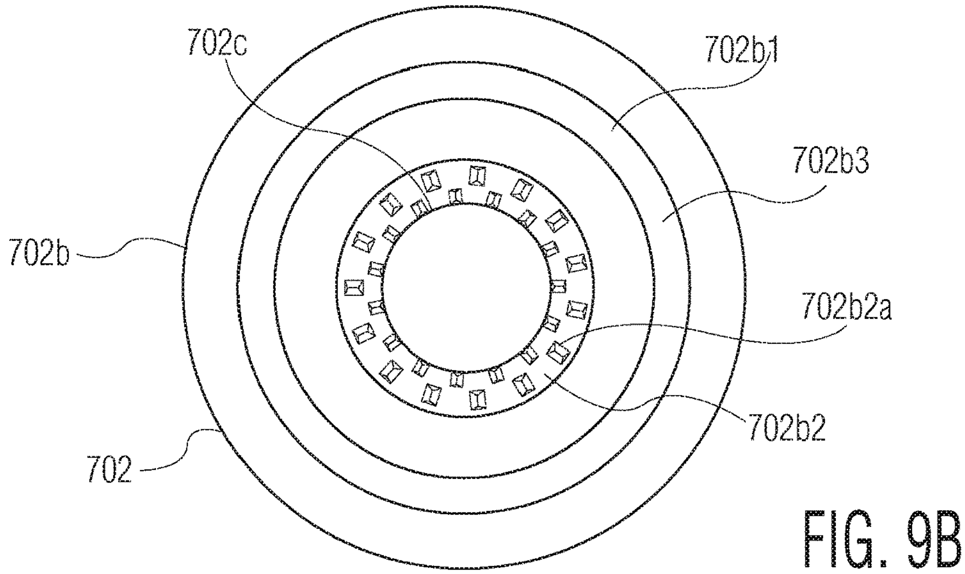
Figure 9C:
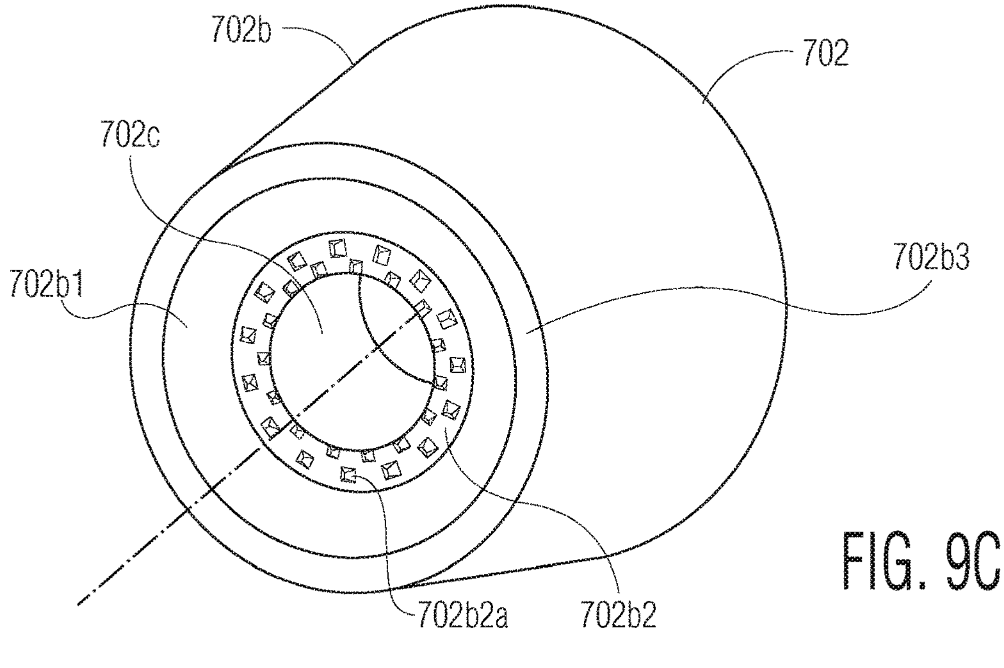

FIGS. 8A-8C illustrate a tip portion **602*b* of a sonotrode 602. A working surface 602*b*2 of sonotrode 602 includes a plurality of protrusions 602*b*2*a* extending from a planar portion of working surface 602*b*2 in a radial pattern between an alignment feature 602*b*1 and an aperture 602*c*. The plurality of protrusions 602*b*2*a* are arranged radially between aperture 602*c* and alignment feature 602*b*1. Protrusions may occur in any number, profile, shape, width, etc. It is also contemplated that there could be multiple rows of protrusions. For example, FIGS. 9A-9C illustrate a tip portion 702*b* of a sonotrode 702, defining an aperture 702*c*. Working surface 702*b*2 includes a plurality of protrusions 702*b*2*a* occurring in multiple rows (e.g., multiple concentric rows). It is contemplated that additional rows could be useful, or that each row could have a different shape of protrusions, all within the scope of the invention. In the exemplary embodiment shown in FIGS. 9A-9**C, ones of the plurality of protrusions are offset from adjacent ones of the plurality of protrusions (e.g., protrusions in the inner row are offset from protrusions in the adjacent outer row).

Figure 10A:
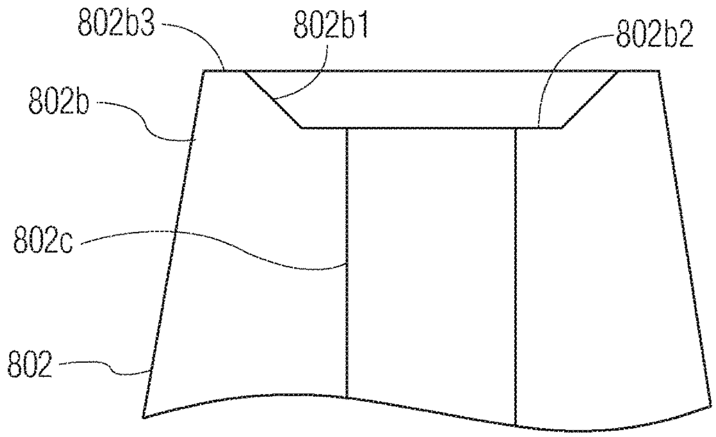
Figure 10B:
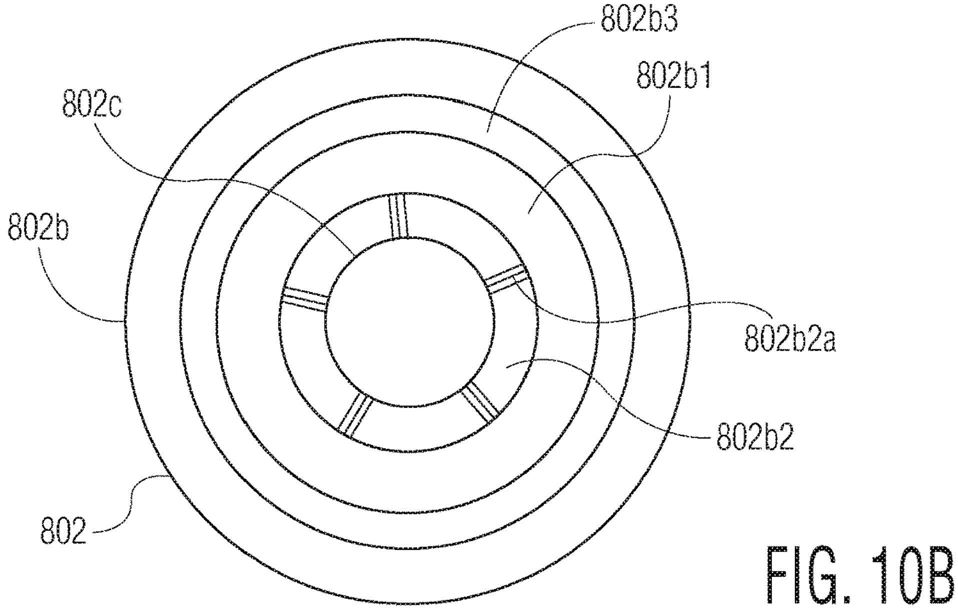
Figure 10C:
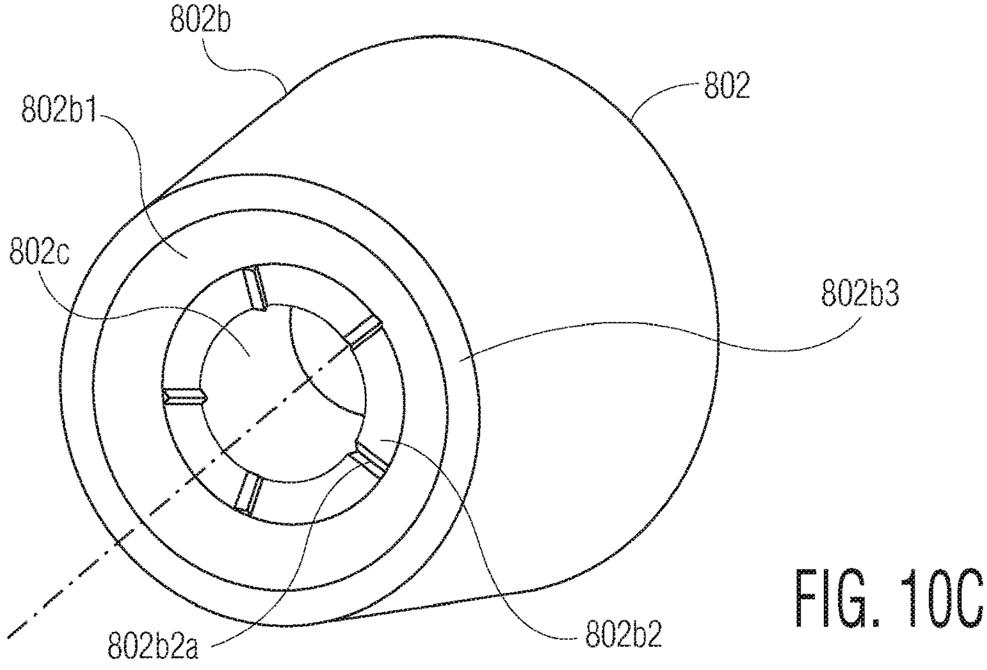

FIGS. 10A-10C illustrate a tip portion **802*b* of a sonotrode 802, defining an aperture 802*c*, and including a working surface 802*b*2 and an alignment feature 802*b*1. A plurality of grooves 802*b*2*a* are defined by a planar portion of working surface 802*b*2. The plurality of grooves 802*b*2*a* may occur in any number, profile, shape, width, etc. It is also contemplated that there could be multiple rows of grooves. In the illustrated embodiment, the plurality of grooves 802*b*2*a* are arranged radially between aperture 802*c* and alignment feature 802*b*1. In certain embodiments, ones of the plurality of grooves 802*b*2*a* may be offset from adjacent ones of the plurality of grooves 802*b*2*a***.

Figure 11A:
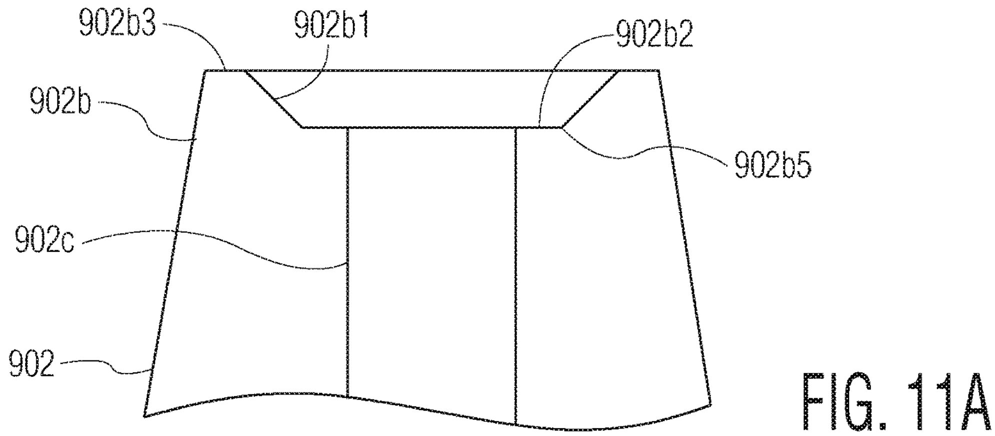
Figure 11B:
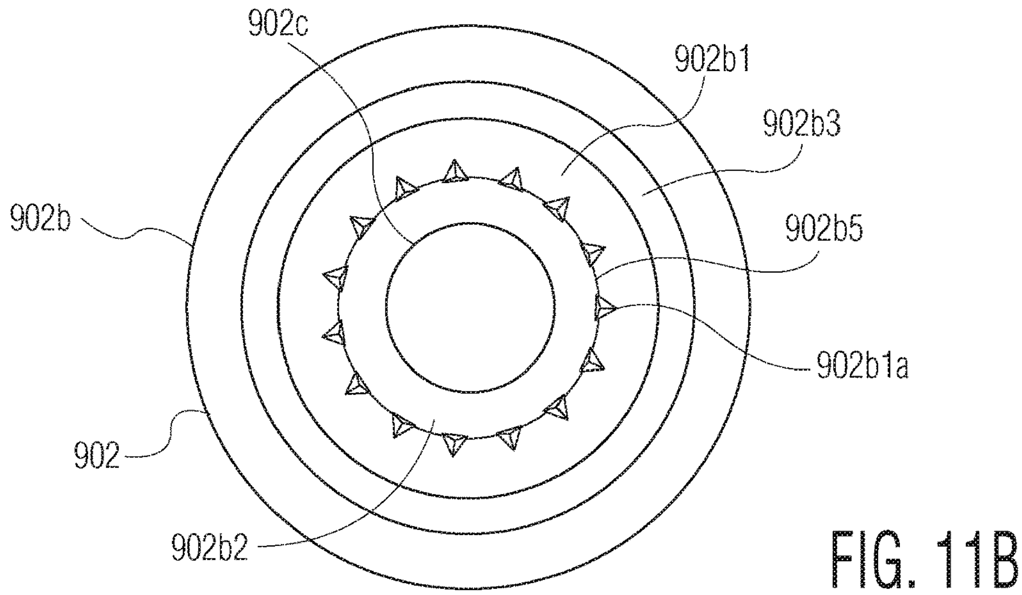
Figure 11C:
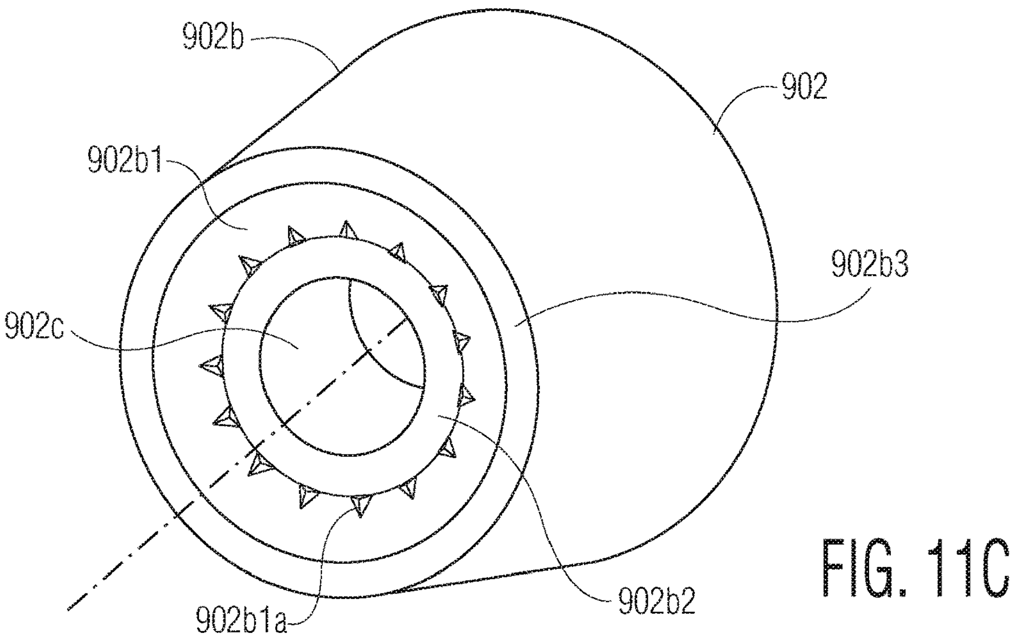

FIGS. 11A-11C illustrate a tip portion **902*b* of a sonotrode 902, defining an aperture 902*c*. A plurality of protrusions 902*b*1*a* are provided at an interface 902*b*5 between an alignment feature 902*b*1 and a working surface 902*b*2**. Protrusions may occur in any number, profile, shape, width, etc.

Figure 12A:
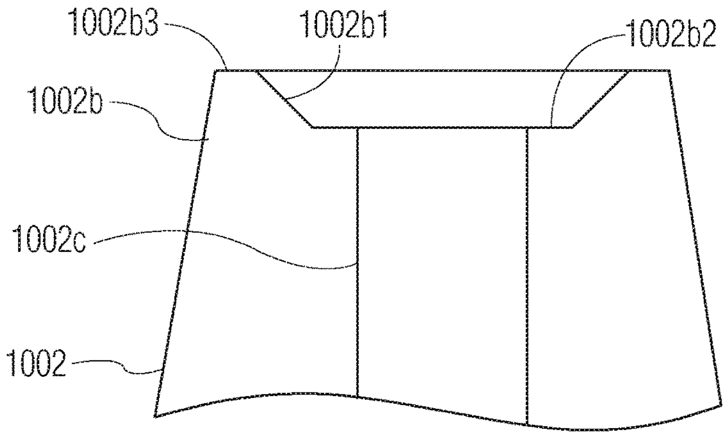
Figure 12B:
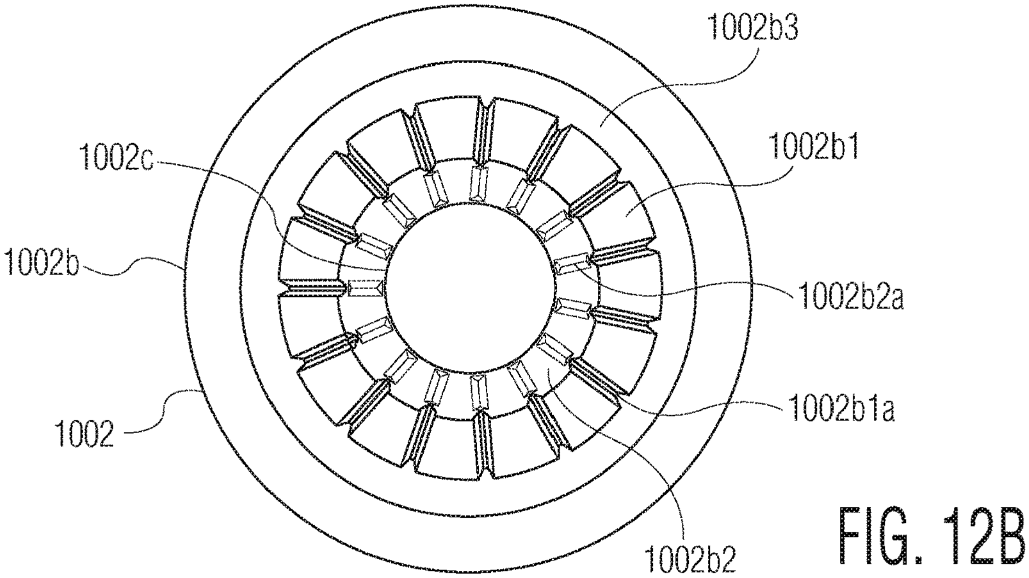
Figure 12C:
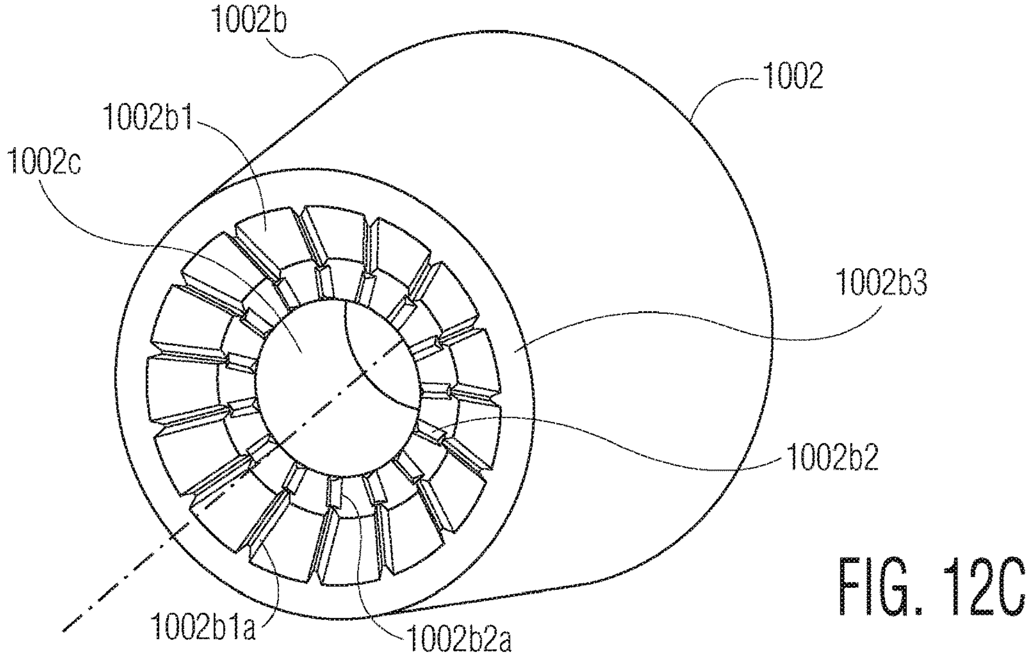

In addition to embodiments that include a single surface having an additional feature (e.g., the protrusions, grooves, and/or depressions illustrated in FIGS. 5-11), it is contemplated that any of the features illustrated and/or described herein can be combined with any other feature illustrated and/or described herein. For example, FIGS. 12A-12C illustrate a tip portion **1002*b* of a sonotrode 1002, defining an aperture 1002*c*. Protrusions 1002*b*1*a* extend from an alignment feature 1002*b*1 and protrusions 1002*b*2*a* extend from a working surface 1002*b*2. It is contemplated that there could be any number of protrusions, a different number of protrusions on each surface, the protrusions of one surface can be offset from protrusions of the other surface, etc. The tip portion 1002*b* illustrated in FIGS. 12A-12C may be described as an embodiment where alignment feature 1002*b*1 includes a plurality of tapered portions (i.e., fifteen regions of alignment feature 1002*b*1) extending toward working surface 1002*b*2**.

Figure 13A:
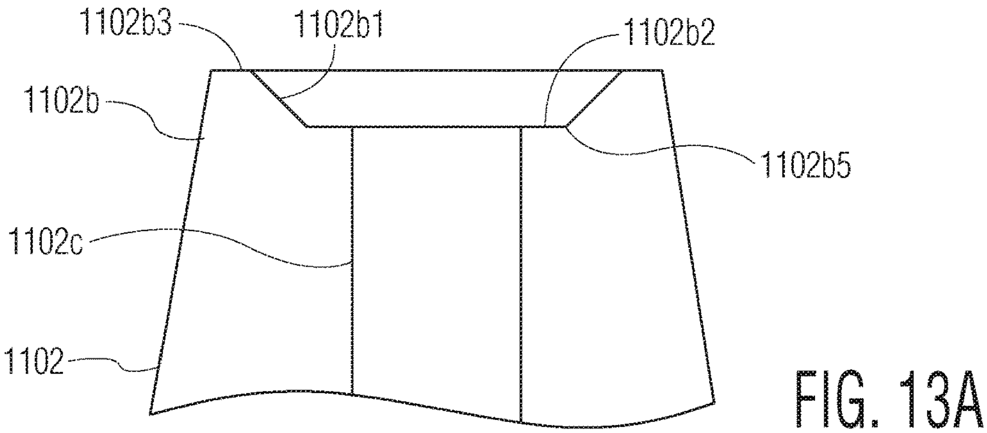
Figure 13B:
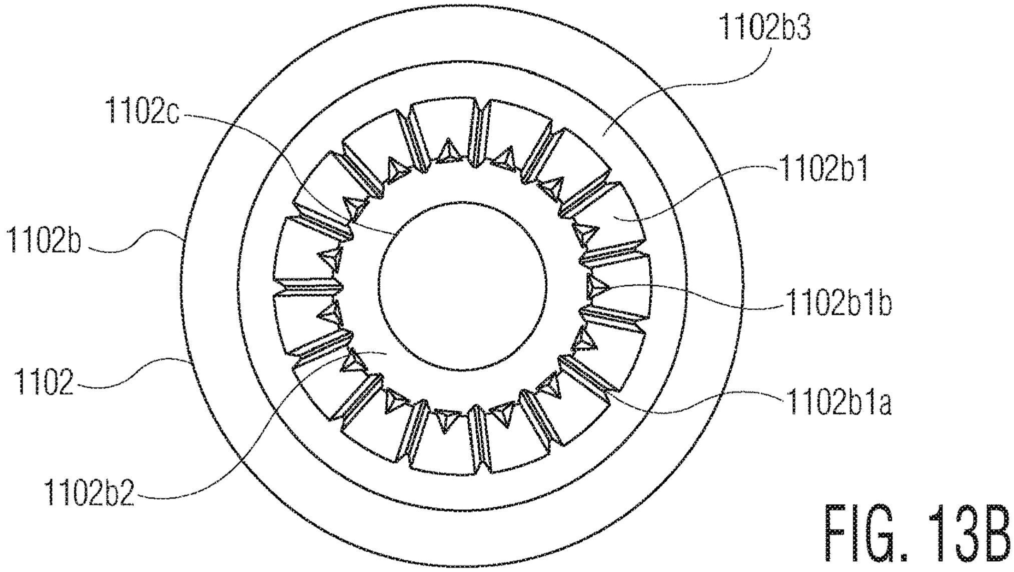
Figure 13C:
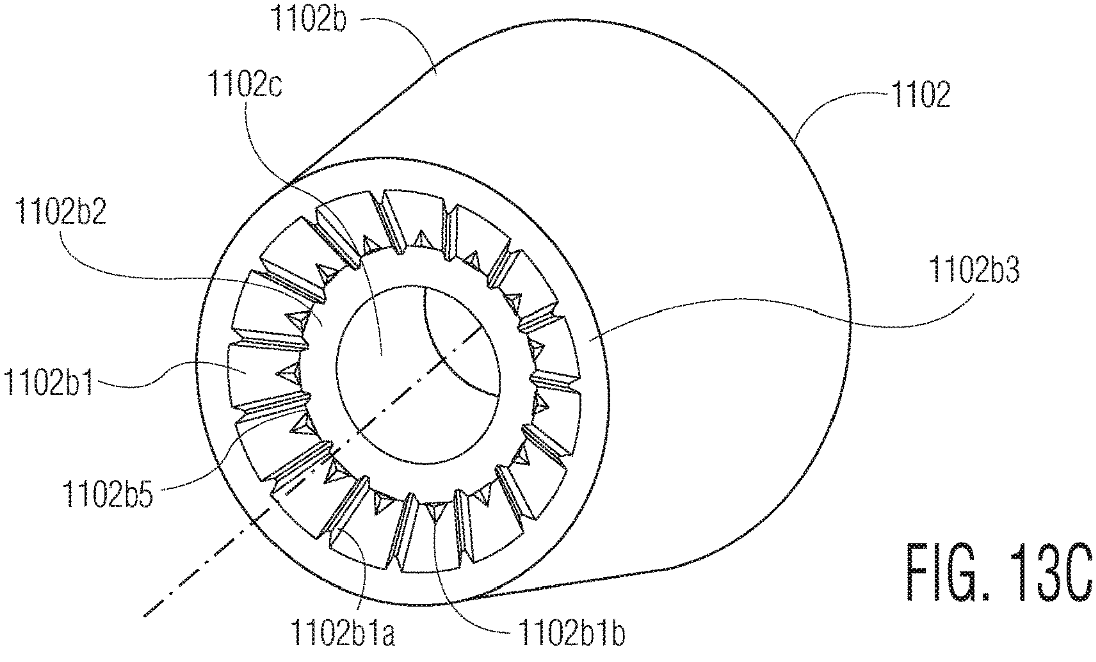

FIGS. 13A-13C illustrate a tip portion **1102*b* of a sonotrode 1102, defining an aperture 1102*c*. A plurality of protrusions 1102*b*1*a* extend from an alignment feature 1102*b*1, and a plurality of protrusions 1102*b*1*b* are provided at an interface 1102*b*5 between alignment feature 1102*b*1 and a working surface 1102*b*2. It is contemplated that there could be any number of protrusions, a different number of protrusions on each surface, one plurality of protrusions can be offset from the other plurality of protrusions, etc. The tip portion 1102*b* illustrated in FIGS. 13A-13C may be described as an embodiment where alignment feature 1102*b*1 includes a plurality of tapered portions (i.e., fifteen regions of alignment feature 1102*b*1) extending toward working surface 1102*b*2**.

Figure 14A:
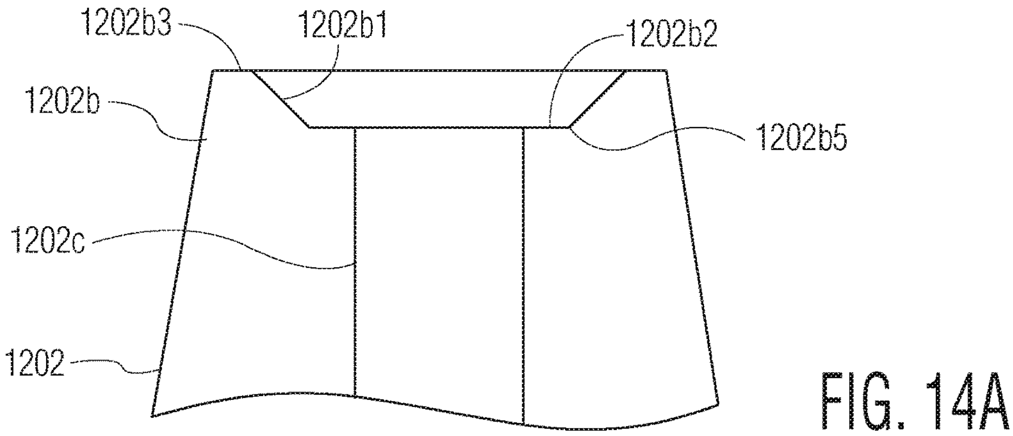
Figure 14B:
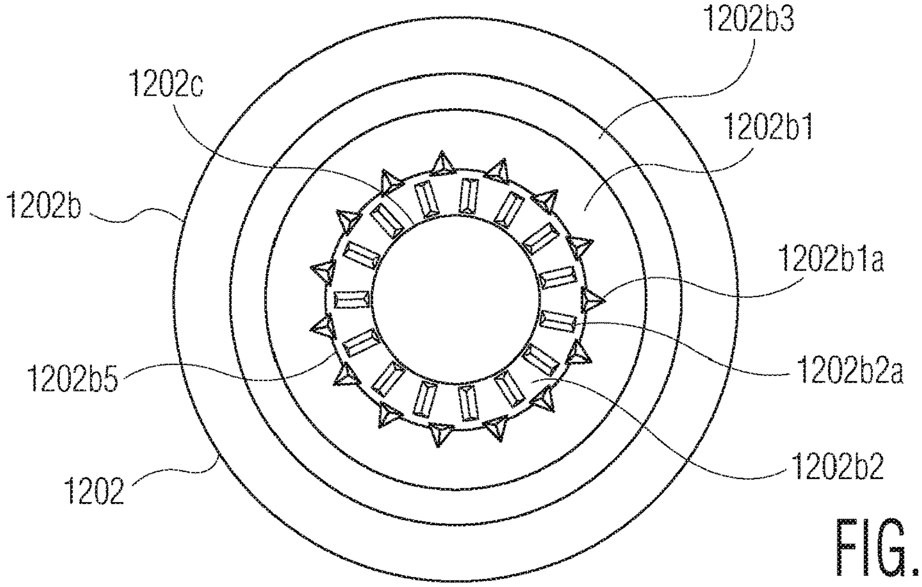
Figure 14C:
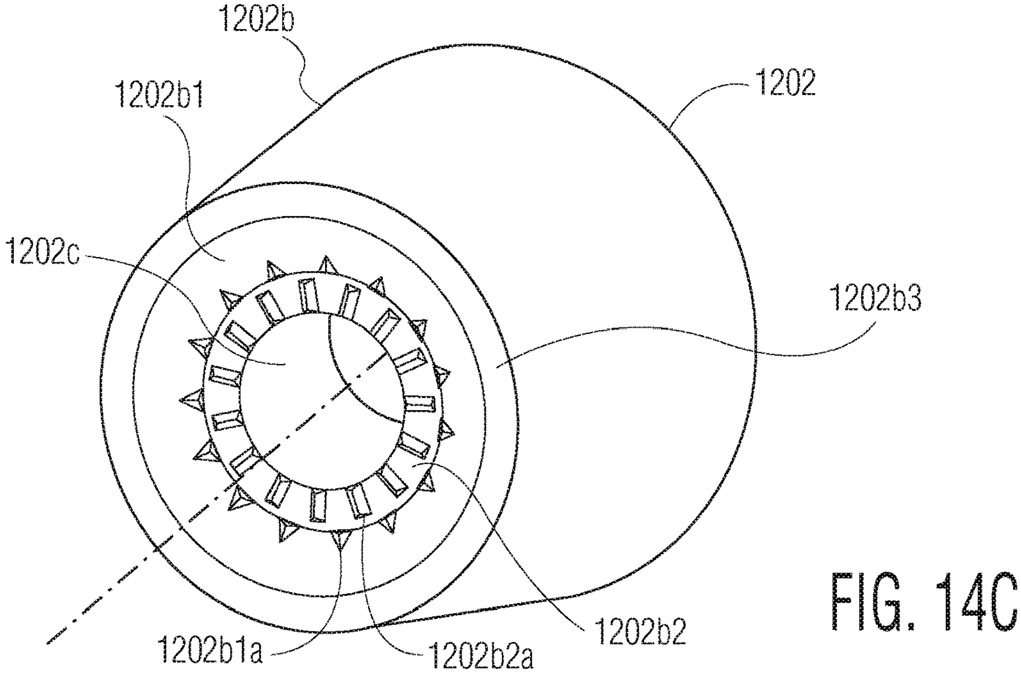

FIGS. 14A-14C illustrate a tip portion 1202*b* of a sonotrode 1202, defining an aperture 1202*c*. A plurality of protrusions 1202*b*1*a* are provided at an interface 1202*b*5 between an alignment feature 1202*b*1 and a working surface 1202*b*2 and another plurality of protrusions 1202*b*2*a* extending from working surface 1202*b*2.

Figure 15A:
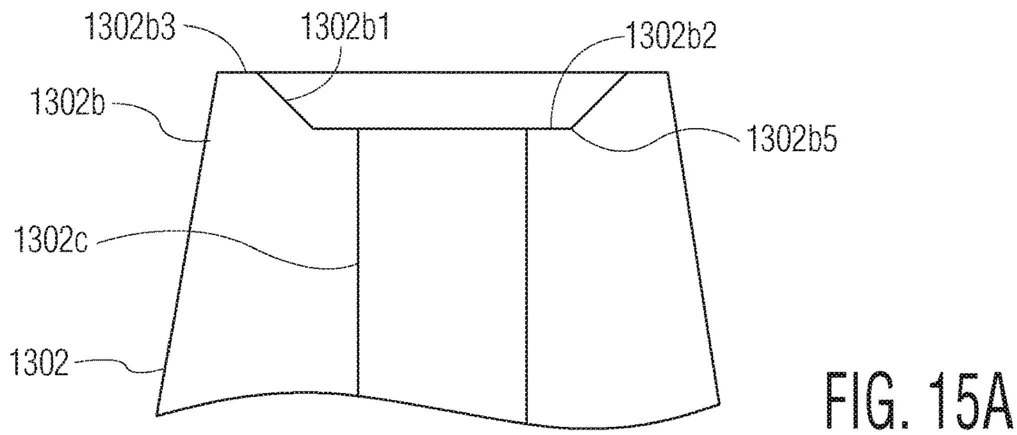
Figure 15B:
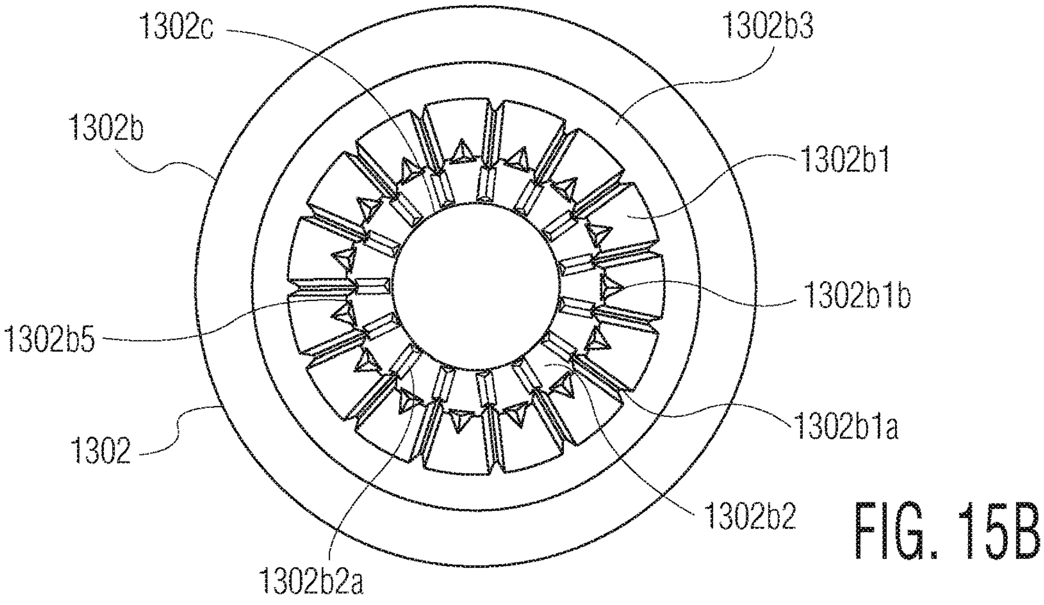
Figure 15C:
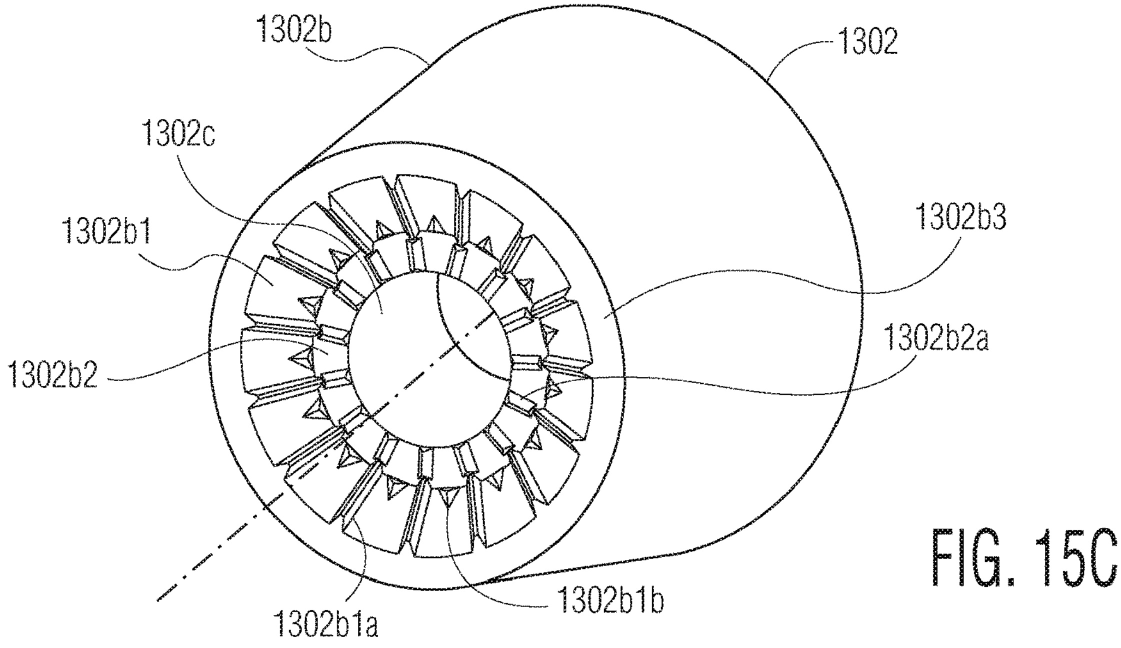
Figure 16A:
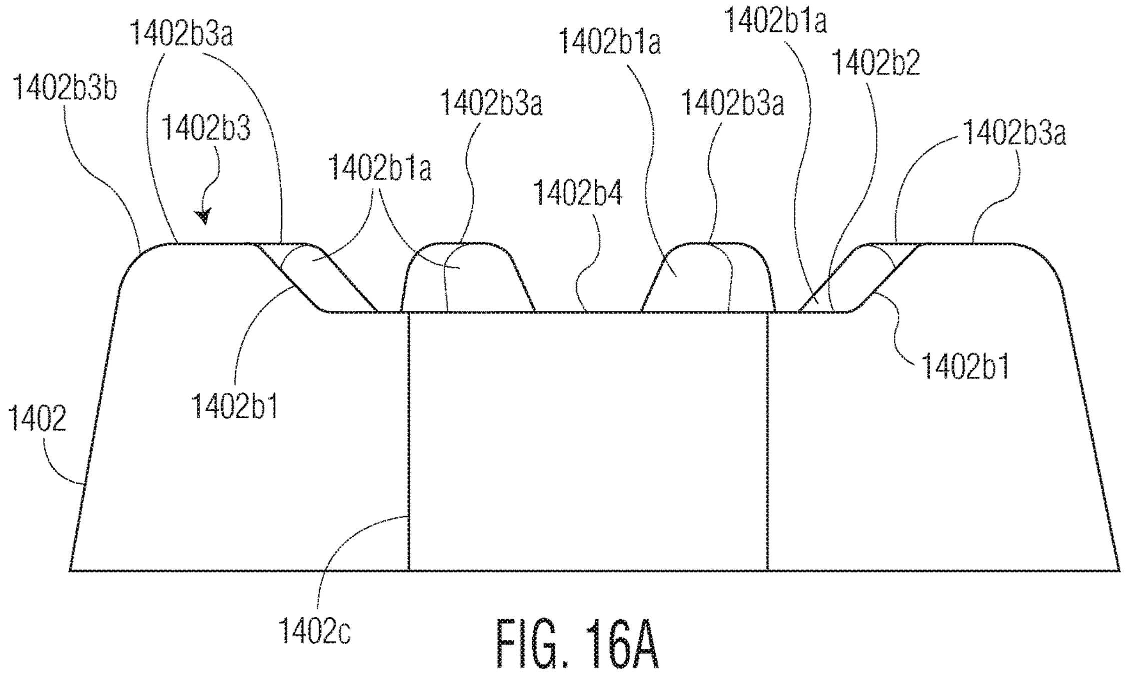
Figure 16B:
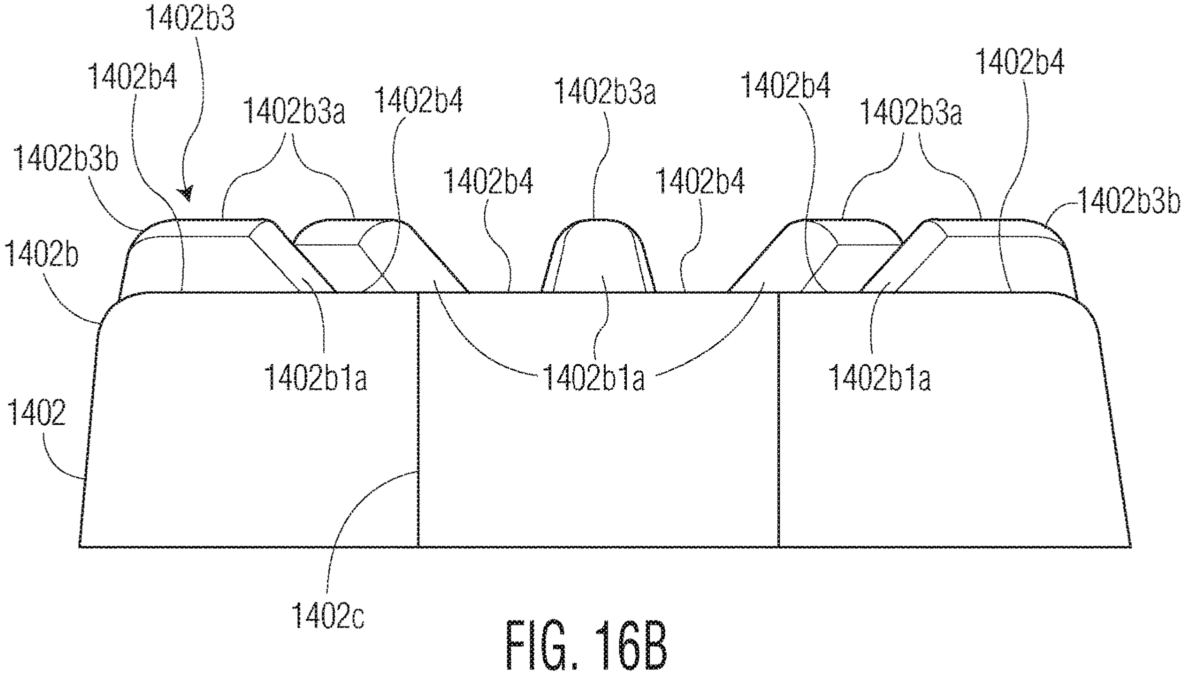
Figure 16D:
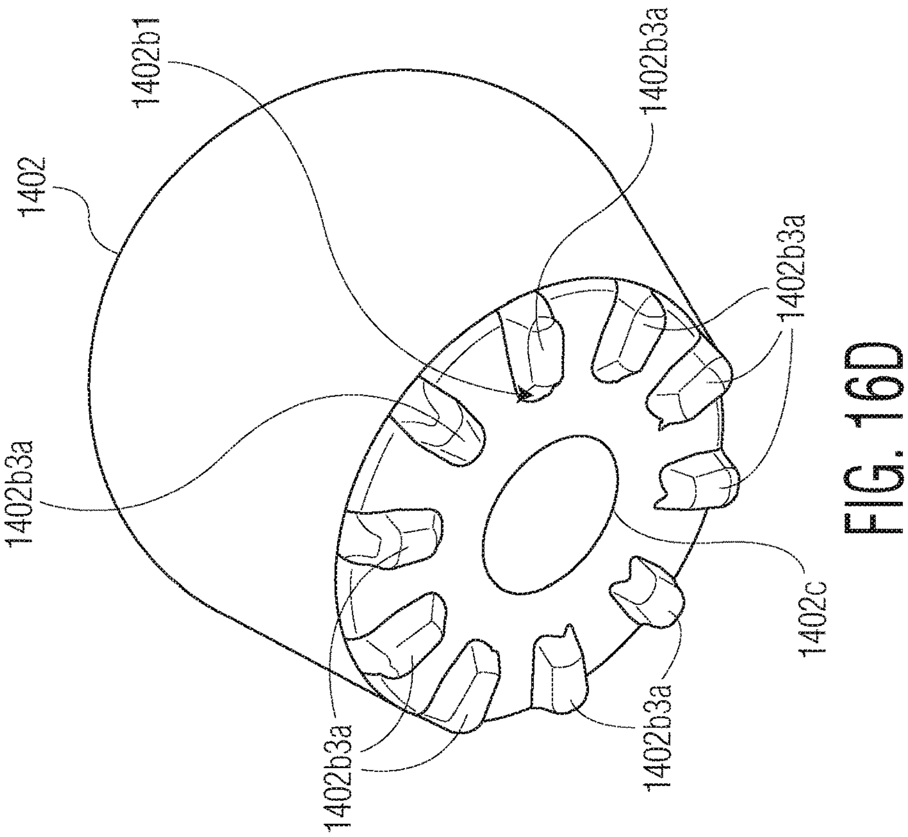
Figure 16C:
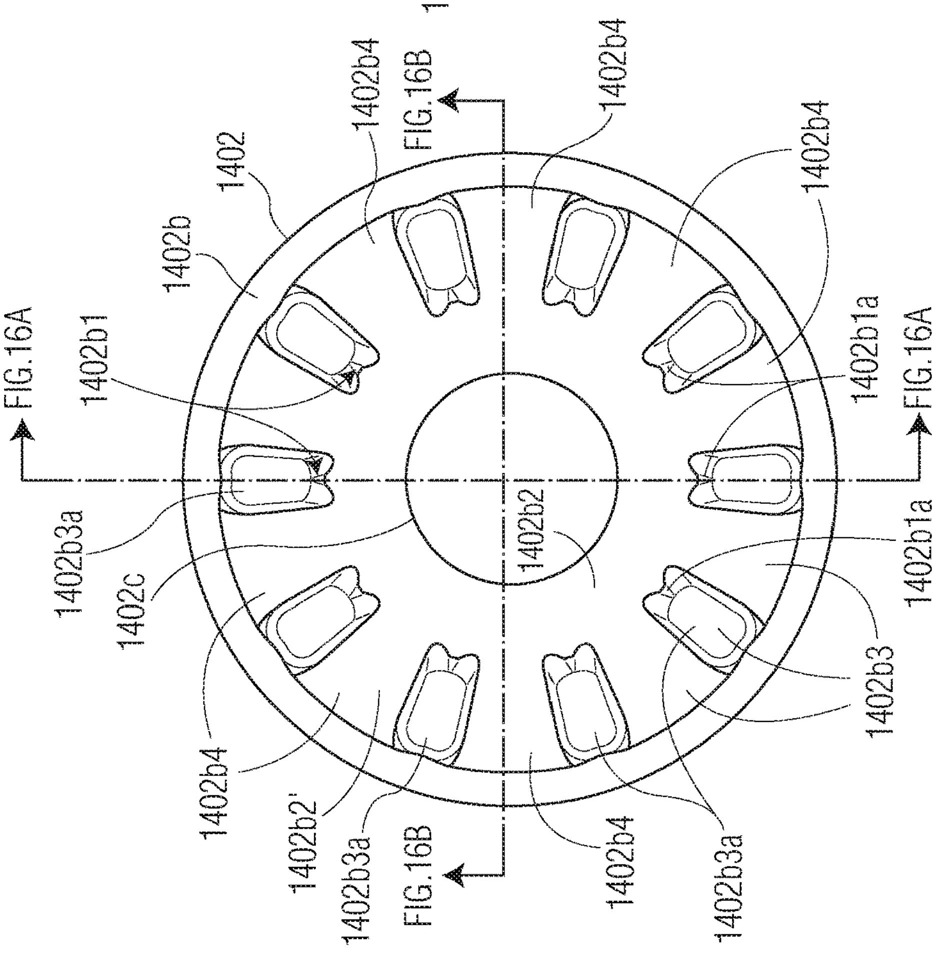
Figure 17A:
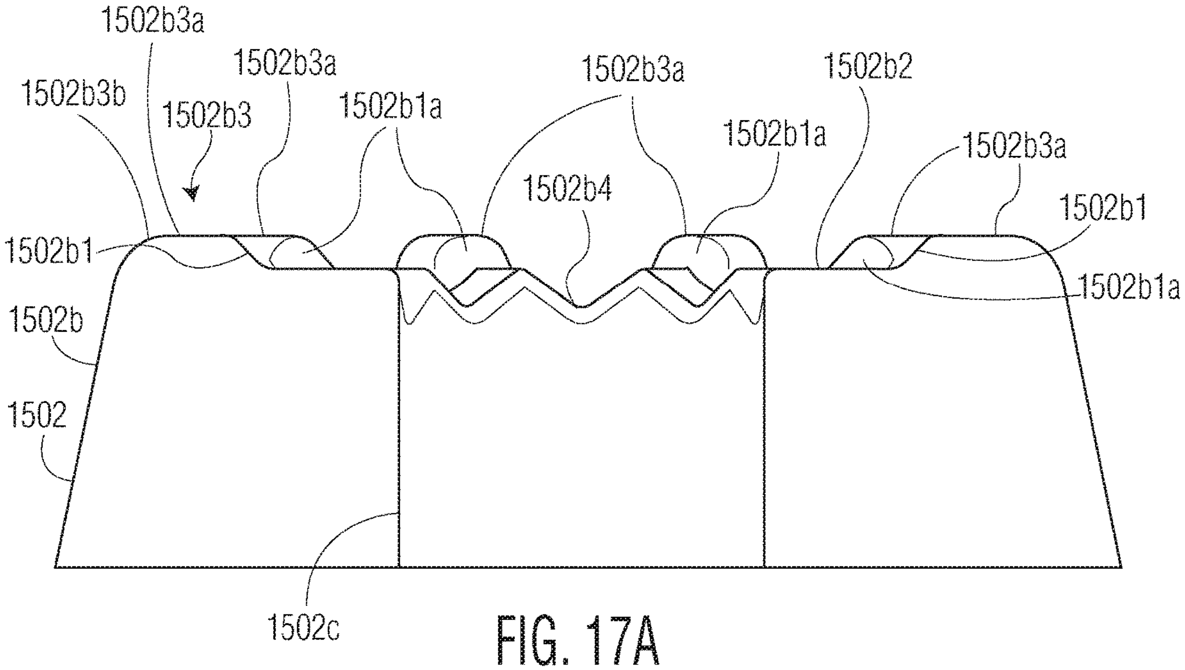
Figure 17B:
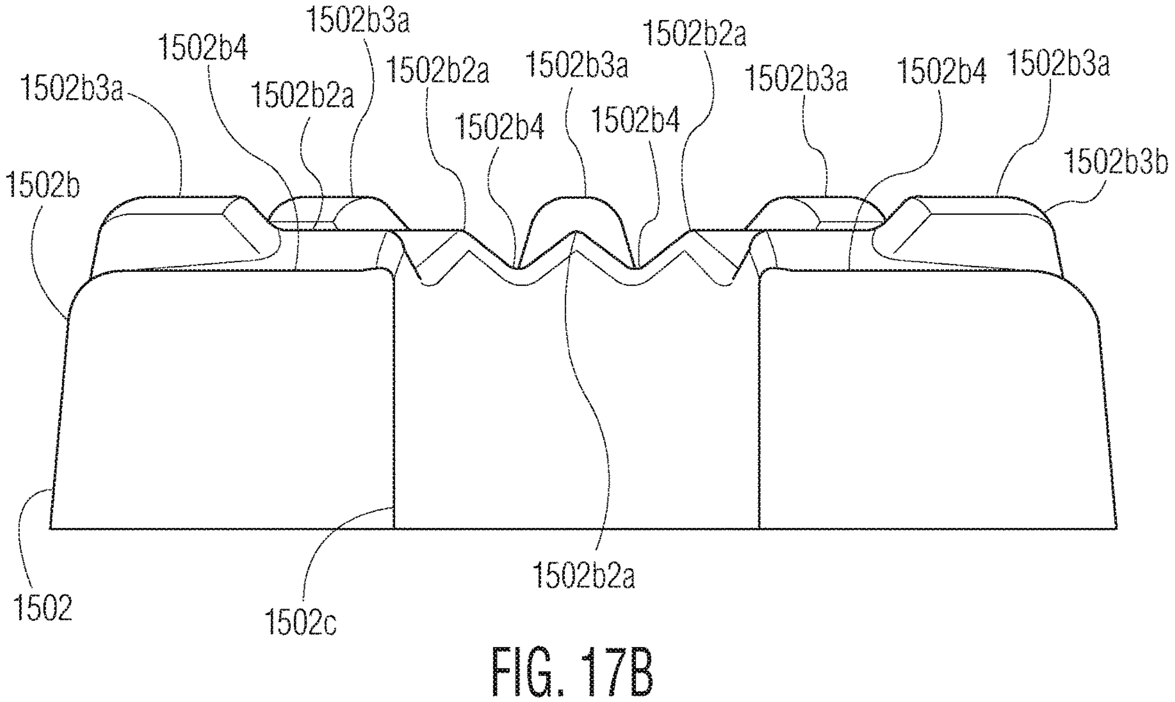
Figure 17D:
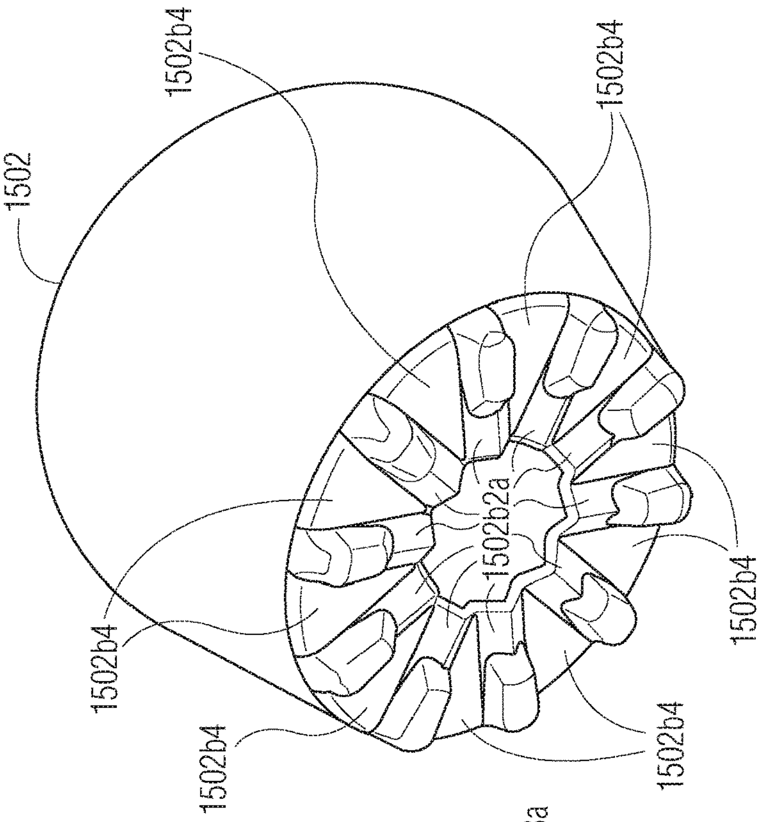
Figure 17C:
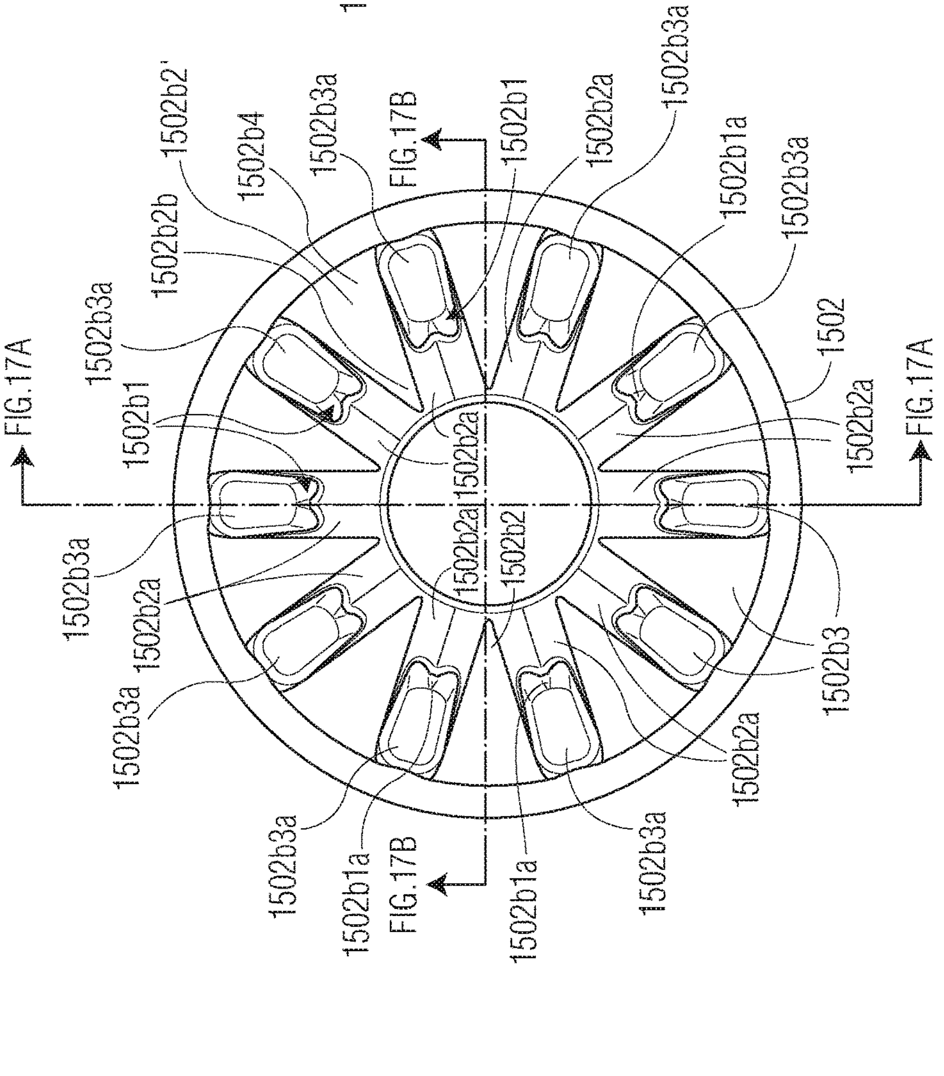
Figure 18A:
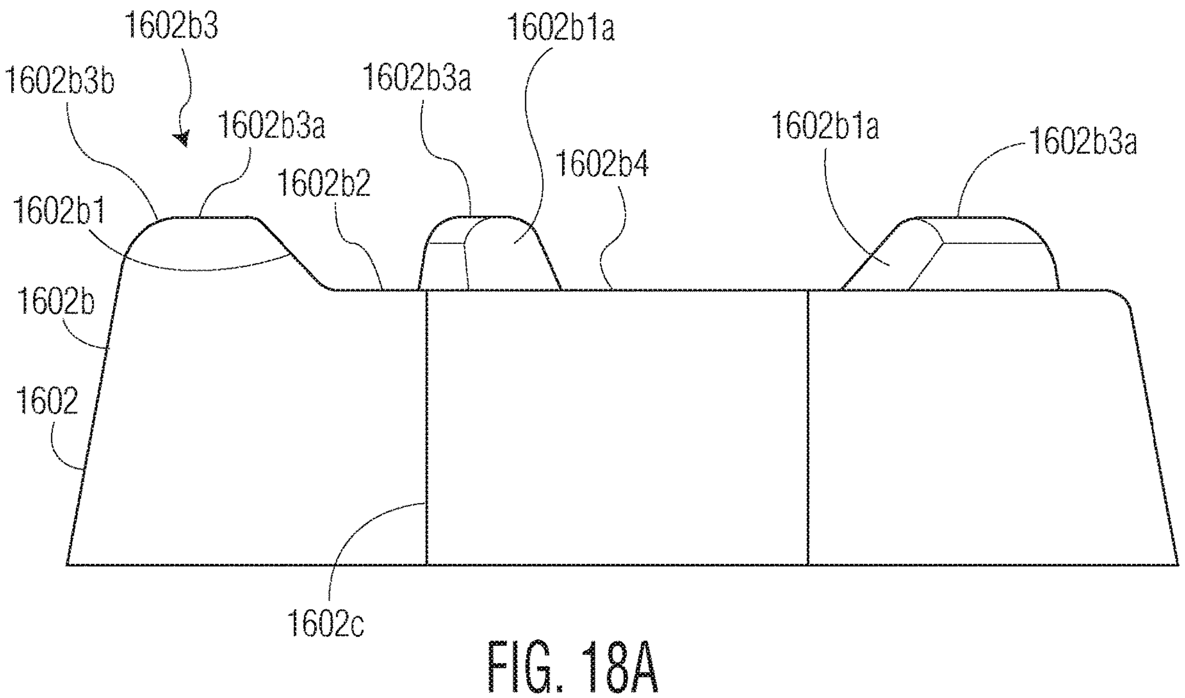
Figure 18B:
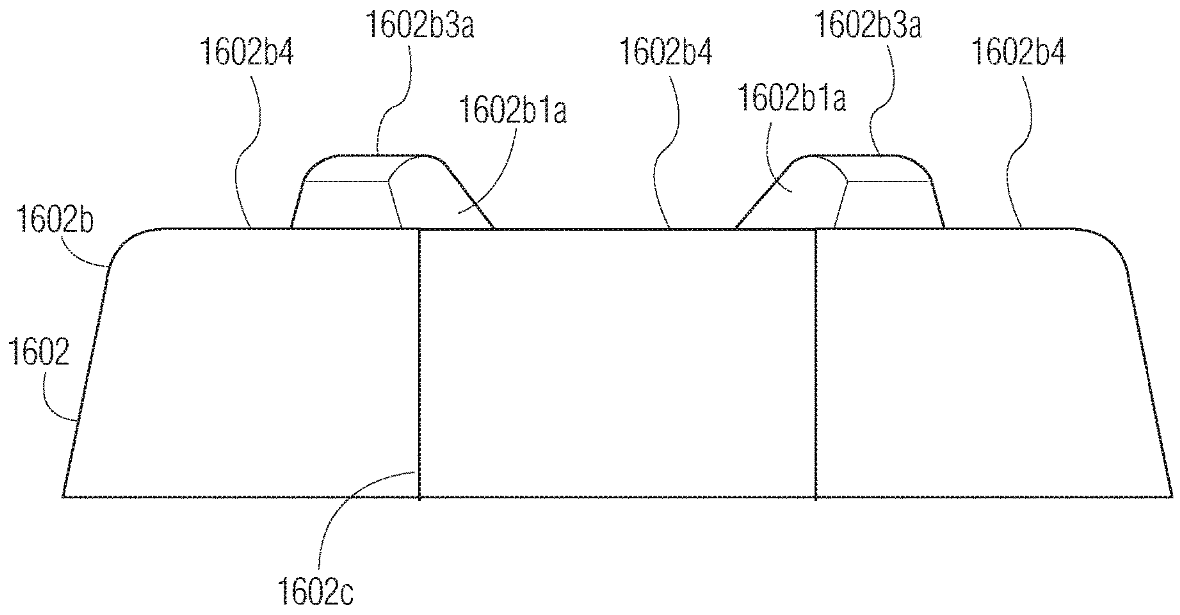
Figure 18D:
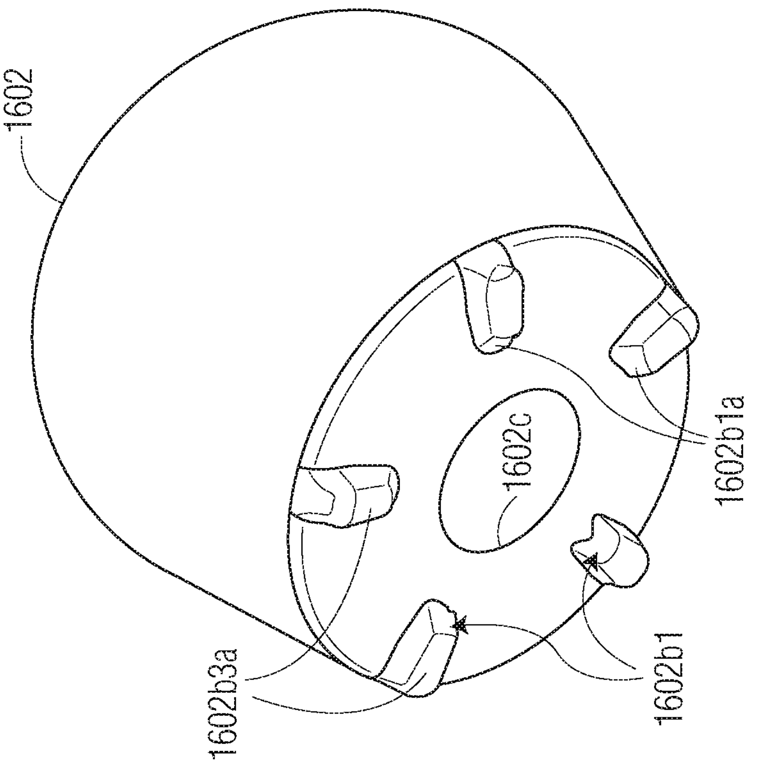
Figure 18C:
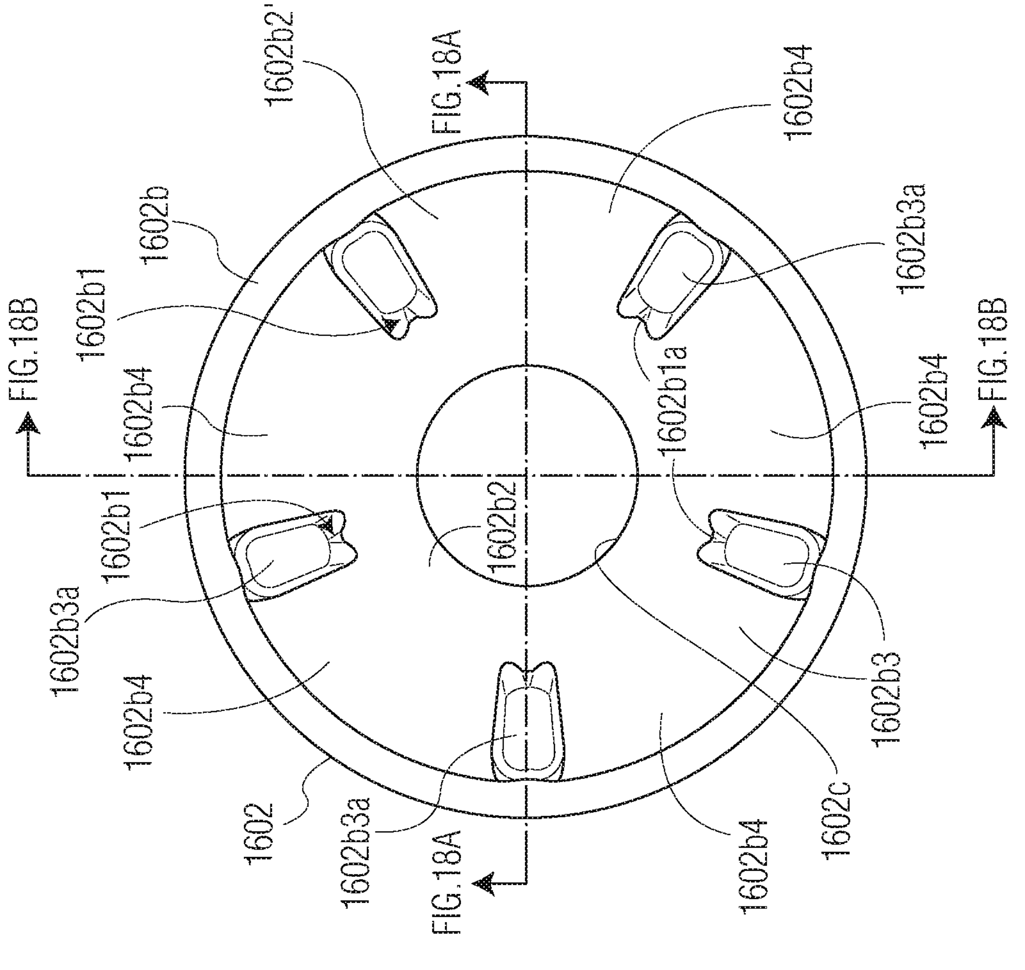
Figure 19A:
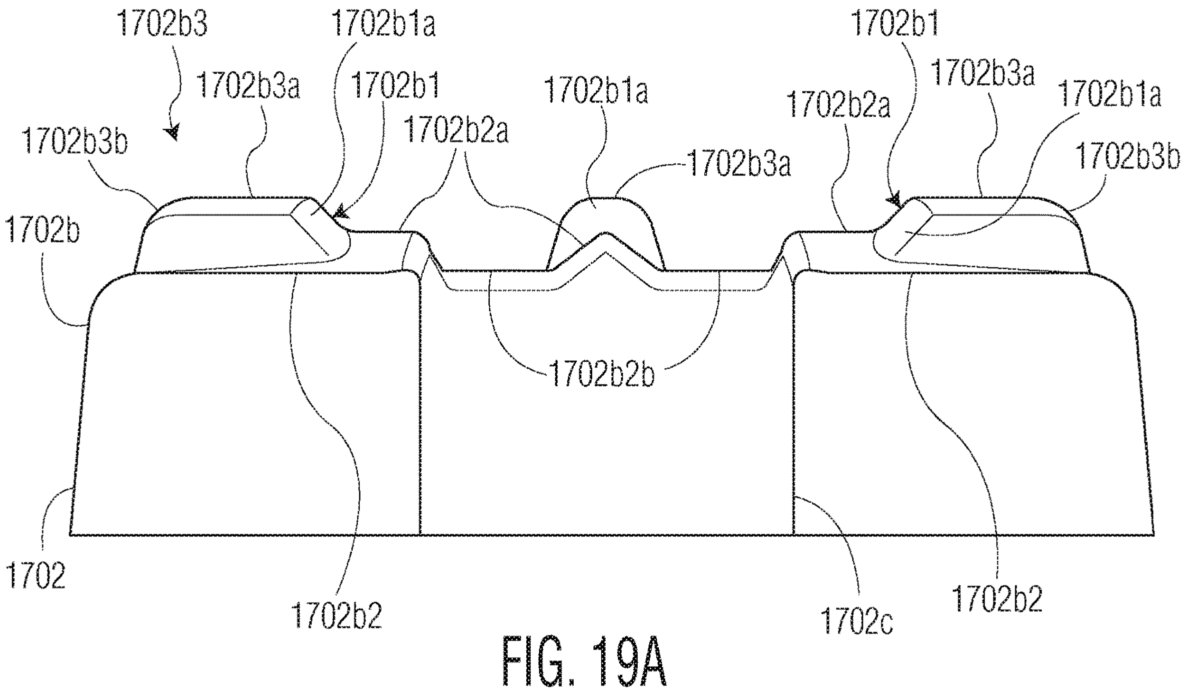
Figure 19B:
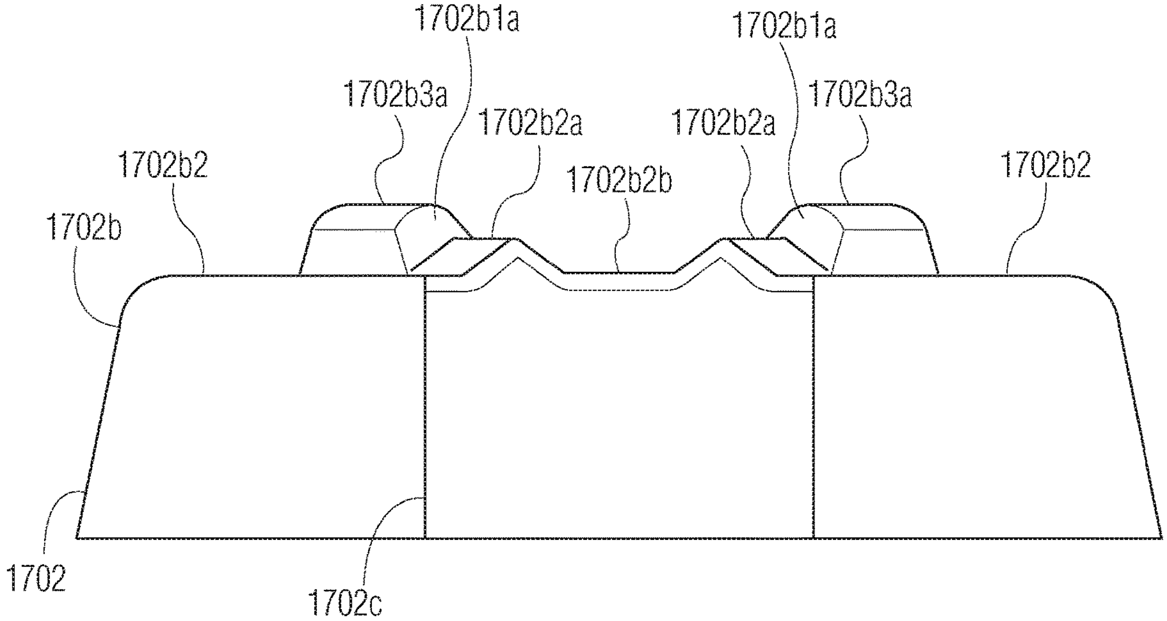
Figure 19D:
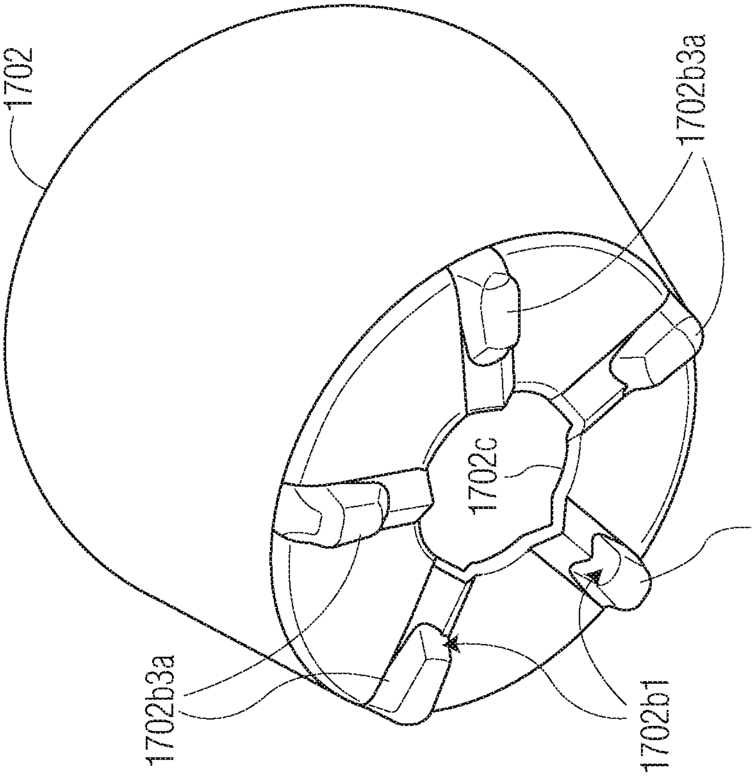
Figure 19C:
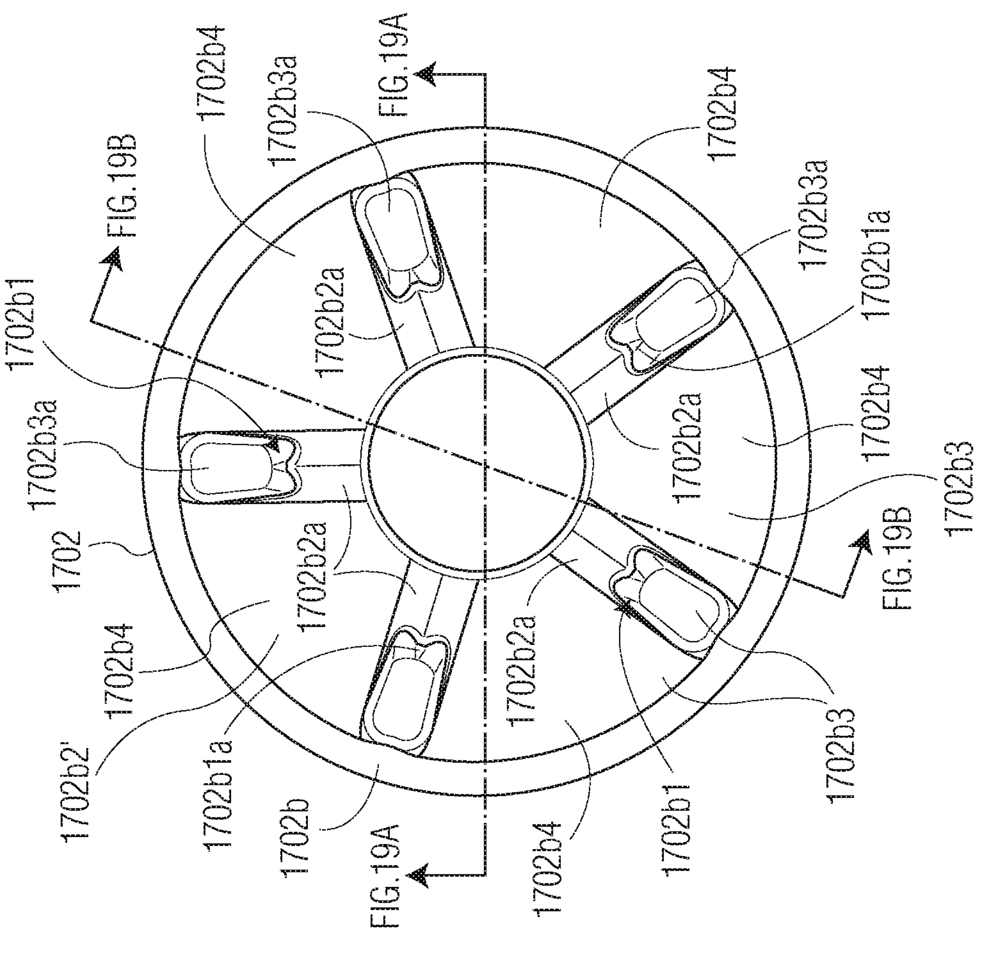

FIGS. 15A-15C illustrate a tip portion 1302*b* of a sonotrode 1302, defining an aperture 1302*c*. A plurality of protrusions 1302*b*1*a* extend from an alignment feature 1302*b*1, another plurality of protrusions 1302*b*1*b* are provided at an interface 1302*b*5 between alignment feature 1302*b*1 and a working surface 1302*b*2, and yet another plurality of protrusions 1302*b*2*a* extending from working surface 1302*b*2. For the purposes of conciseness, other possible combinations of features are not illustrated. However, it is contemplated that any combination of features (protrusions or depressions, curved alignment feature surface or straight alignment feature surface, etc.) is contemplated and within the scope of the invention. The tip portion 1302*b* illustrated in FIGS. 15A-15C may be described as an embodiment where alignment feature 1302*b*1 includes a plurality of tapered portions (i.e., fifteen regions of alignment feature 1302*b*1) extending toward working surface 1302*b*2.

Various embodiments of the invention have been described with respect to an alignment feature including a tapered surface along with a plurality of protrusions (e.g., tapered protrusions) extending from the tapered surface (e.g., see FIGS. 5A-5C, FIGS. 6A-6C, FIGS. 12A-12C, FIGS. 13A-13C, FIGS. 15A-15C. etc.), or a plurality of depressions extending below the tapered surface (e.g., see FIGS. 7A-7C, etc.). For example, see alignment feature 302*b*1 in FIGS. 5A-5C, including a plurality of protrusions 302*b*1*a* (e.g., tapered protrusions) extending from a tapered surface (not labelled) of alignment feature 302*b*1. However, the invention is not limited to such embodiments. For example, a plurality of protrusions included in the alignment feature may extend from a planar (or flat surface) as opposed to a tapered surface—where such a planar surface may be continuous with the working surface.

Further, various embodiments of the invention have been illustrated with respect to a sonotrode having an outer portion (e.g., beyond the alignment feature) of the tip portion that is planar. For example, see outer portion 102*b*3 in FIGS. 3A-3C, outer portion 202*b*3 in FIGS. 4A-4C, outer portion 302*b*3 in FIGS. 5A-5C, outer portion 402*b*3 in FIGS. 6A-6C, outer portion 502*b*3 in FIGS. 7A-7C, outer portion 602*b*3 in FIGS. 8A-8C, outer portion 702*b*3 in FIGS. 9A-9C, outer portion 802*b*3 in FIGS. 10A-10C, outer portion 902*b*3 in FIGS. 11A-11C, outer portion 1002*b*3 in FIGS. 12A-12C, outer portion 1102*b*3 in FIGS. 13A-13C, outer portion 1202*b*3 in FIGS. 14A-14C, and outer portion 1302*b*3 in FIGS. 15A-15C. However, the invention is not limited to such a planar outer surface. For example, the outer portion in any of the embodiments shown or described herein (or otherwise within the scope of the invention) may be non-planar. Such a non-planar outer portion may include a plurality of protrusions arranged in a radial (e.g., circular) configuration. Such protrusions may be continuous with respective protrusions included in the alignment feature. The “gaps” or “depressions” between such protrusions may provide a path for excess material or “whiskers” formed from the ultrasonic welding process to exit the tip of the sonotrode (where such whiskers are material from bonded conductive pins). By providing a path for the excess material or whisker material to exit the sonotrode, the potential for undesirable material build up at the sonotrode tip is reduced.

As detailed below, each of FIGS. 16A-16D, FIGS. 17A-17D, FIGS. 18A-18D, and FIGS. 19A-19D illustrate examples of the features described in the immediately preceding two paragraphs.

FIGS. 16A-16D illustrate a tip portion 1402*b* of a sonotrode 1402. Tip portion 1402*b* includes an aperture 1402*c*, a working surface 1402*b*2 (e.g., a flat and/or planar working surface), an alignment feature 1402*b*1, and an outer portion 1402*b*3. Outer portion 1402*b*3 is provided between alignment feature 1402*b*1 and an outer edge 1402*b*3*b* of tip portion 1402*b* (e.g., the intersection of an outer wall of tip portion 1402*b* and bottom surface of tip portion 1402*b*). Alignment feature 1402*b*1 includes a plurality of tapered portions 1402*b*1*a* arranged in a radial configuration/pattern around aperture 1402*c*, with the tapered portions 1402*b*1*a* extending above a planar surface 1402*b*2' (e.g., where planar surface 1402*b*2' is continuous with working surface 1402*b*2 of tip portion 1402*b*). Outer portion 1402*b*3 includes a plurality of outer protrusions 1402*b*3*a* extending above planar surface 1402*b*2'. Depressions 1402*b*4 are defined between ones of the plurality of outer protrusions 1402*b*3*a* and between ones of the tapered portions 1402*b*1*a*. As shown in FIGS. 16A-16D, each of the plurality of tapered portions 1402*b*1*a* is integrated with a corresponding one of the plurality of outer protrusions 1402*b*3*a* (e.g., a tapered portion 1402*b*1*a* and an outer protrusion 1402*b*3*a* are formed as a single structure, formed from a unitary piece of material, etc.). Depressions 1402*b*4 between outer protrusions 1402*b*3*a* may be configured to allow for outflow of material (e.g., whiskers) produced in connection with an ultrasonic welding process.

FIGS. 17A-17D illustrate a tip portion 1502*b* of a sonotrode 1502. Tip portion 1502*b* includes an aperture 1502*c*, a working surface 1502*b*2, an alignment feature 1502*b*1, and an outer portion 1502*b*3. Working surface 1502*b*2 includes a plurality of working surface protrusions 1502*b*2*a* (e.g., triangular or pyramidal protrusions are illustrated) as well as a plurality of depressions 1502*b*2*b* (e.g., planar portions) therebetween (only one of the plurality of depressions 1502*b*2*b* is labelled in FIG. 17C). Outer portion 1502*b*3 is provided between alignment feature 1502*b*1 and an outer edge 1502*b*3*b* of tip portion 1502*b* (e.g., the intersection of an outer wall of tip portion 1502*b* and bottom surface of tip portion 1502*b*). Alignment feature 1502*b*1 includes the plurality of tapered portions 1502*b*1*a* arranged in a radial configuration/pattern around aperture 1502*c*, with the tapered portions 1502*b*1*a* extending above a planar surface 1502*b*2' (e.g., where planar surface 1502*b*2' is continuous with a portion of working surface 1502*b*2 of tip portion 1502*b*, namely with the plurality of depressions 1502*b*2*b* of working surface 1502*b*2). Outer portion 1502*b*3 includes a plurality of outer protrusions 1502*b*3*a* extending above planar surface 1502*b*2'. Depressions 1502*b*4 are defined between ones of the plurality of outer protrusions 1502*b*3*a* and between ones of the tapered portions 1502*b*1*a*. As shown in FIGS. 17A-17D, each of the plurality of tapered portions 1502*b*1*a* is integrated with a corresponding one of the plurality of outer protrusions 1502*b*3*a* (e.g., a tapered portion 1502*b*1*a* and an outer protrusion 1502*b*3*a* are formed as a single structure, formed from a unitary piece of material, etc.). Likewise, in the embodiment illustrated in FIGS. 17A-17D, each of the plurality of working surface protrusions 1502*b*2*a* are integrated with a corresponding one of the plurality of tapered portions 1502*b*1*a* and a corresponding one of outer protrusions 1502*b*3*a*. Depressions 1502*b*4 between outer protrusions 1502*b*3*a* may be configured to allow for outflow of material (e.g., whiskers) produced in connection with an ultrasonic welding process.

While FIGS. 16A-16D and FIGS. 17A-17D illustrate ten protrusions, the invention is not so limited. The number of protrusions may be any number depending on the application. For example, FIGS. 18A-18D and FIGS. 19A-19D include five protrusions.

FIGS. 18A-18D illustrate a tip portion 1602*b* of a sonotrode 1602. Tip portion 1602*b* includes an aperture 1602*c*, a working surface 1602*b*2 (e.g., a flat and/or planar working surface), an alignment feature 1602*b*1, and an outer portion 1602*b*3. Outer portion 1602*b*3 is provided between alignment feature 1602*b*1 and an outer edge 1602*b*3*b* of tip portion 1602*b* (e.g., the intersection of an outer wall of tip portion 1602*b* and bottom surface of tip portion 1602*b*). Alignment feature 1602*b*1 includes a plurality of tapered portions 1602*b*1*a* arranged in a radial configuration/pattern around aperture 1602*c*, with the tapered portions 1602*b*1*a* extending above a planar surface 1602*b*2' (e.g., where planar surface 1602*b*2' is continuous with working surface 1602*b*2 of tip portion 1602*b*). Outer portion 1602*b*3 includes a plurality of outer protrusions 1602*b*3*a* extending above planar surface 1602*b*2'. Depressions 1602*b*4 are defined between ones of the plurality of outer protrusions 1602*b*3*a* and between ones of the tapered portions 1602*b*1*a*. As shown in FIGS. 18A-18D, each of the plurality of tapered portions 1602*b*1*a* is integrated with a corresponding one of the plurality of outer protrusions 1602*b*3*a* (e.g., a tapered portion 1602*b*1*a* and an outer protrusion 1602*b*3*a* are formed as a single structure, formed from a unitary piece of material, etc.). Depressions 1602*b*4 between outer protrusions 1602*b*3*a* may be configured to allow for outflow of material (e.g., whiskers) produced in connection with an ultrasonic welding process.

FIGS. 19A-19D illustrate a tip portion 1702*b* of a sonotrode 1702. Tip portion 1702*b* includes an aperture 1702*c*, a working surface 1702*b*2, an alignment feature 1702*b*1, and an outer portion 1702*b*3. Working surface 1702*b*2 includes a plurality of working surface protrusions 1702*b*2*a* (e.g., triangular or pyramidal protrusions are illustrated) as well as a plurality of depressions 1702*b*2*b* (e.g., planar portions). Outer portion 1702*b*3 is provided between alignment feature 1702*b*1 and an outer edge 1702*b*3*b* of tip portion 1702*b* (e.g., the intersection of an outer wall of tip portion 1702*b* and bottom surface of tip portion 1702*b*). Alignment feature 1702*b*1 includes the plurality of tapered portions 1702*b*1*a* arranged in a radial configuration/pattern around aperture 1702*c*, with the tapered portions 1702*b*1*a* extending above a planar surface 1702*b*2' (e.g., where planar surface 1702*b*2' is continuous with a portion of working surface 1702*b*2 of tip portion 1702*b*, namely with the plurality of depressions 1702*b*2*b* of working surface 1702*b*2). Outer portion 1702*b*3 includes a plurality of outer protrusions 1702*b*3*a* extending above planar surface 1702*b*2'. Depressions 1702*b*4 are defined between ones of the plurality of outer protrusions 1702*b*3*a* and between ones of the tapered portions 1702*b*1*a*. As shown in FIGS. 19A-19D, each of the plurality of tapered portions 1702*b*1*a* is integrated with a corresponding one of the plurality of outer protrusions 1702*b*3*a* (e.g., a tapered portion 1702*b*1*a* and an outer protrusion 1702*b*3*a* are formed as a single structure, formed from a unitary piece of material, etc.). Likewise, in the embodiment illustrated in FIGS. 19A-19D, each of the plurality of working surface protrusions 1702*b*2*a* are integrated with a corresponding one of the plurality of tapered portions 1702*b*1*a* and a corresponding one of outer protrusions 1702*b*3*a*. Depressions 1702*b*4 between outer protrusions 1702*b*3*a* may be configured to allow for outflow of material (e.g., whiskers) produced in connection with an ultrasonic welding process.

It should be understood that various features of the embodiments illustrated in FIGS. 16A-16D, 17A-17D, 18A-18D, and 19A-19D may be combined with any one or more embodiments within the scope of the invention, including but not limited to those illustrated in FIG. 1, FIGS. 2A-2F, FIGS. 3A-3C, FIGS. 4A-4C, FIGS. 5A-5C, FIGS. 6A-6C, FIGS. 7A-7C, FIGS. 8A-8C, FIGS. 9A-9C, FIGS. 10A-10C, FIGS. 11A-11C, FIGS. 12A-12C, FIGS. 13A-13C, FIGS. 14A-14C, and/or FIGS. 15A-15C, and vice versa.

Various sonotrodes within the scope of the invention (including many of those described herein) include a body portion terminating at a tip portion. The body portion and the tip portion may be formed from a unitary piece of material (e.g., steel, stainless steel, a metal alloy, etc.). Alternatively, the body portion and the tip portion may be separate pieces coupled together (e.g., through brazing or other techniques). In connection with embodiments where the body portion and the tip portion are separate pieces, examples of the material of the body portion include steel, stainless steel, a metal alloy, etc., and examples of materials of the tip portion include ceramic, steel, and carbide materials, or a metal alloy.

Aspects of the invention relate to the inclusion of various features at the tip portion of a sonotrode (e.g., protrusions, depressions, grooves, etc.). These features may be formed in the tip portion using any of a number of techniques such as laser scribing, laser irradiation, electro-discharge machining, etc.

Although the invention is illustrated and described herein with reference to an aligned condition of the conductive pin being centered within the sonotrode, the invention is not intended to be limited to such an embodiment. It is contemplated that the geometry of the alignment feature could be manipulated to achieve any desirable alignment condition, including a particular depth of the conductive pin within the sonotrode, an angle of the conductive pin within the sonotrode, or a position of the conductive pin within the sonotrode. It is also contemplated that a single sonotrode could be configured to align a variety of conductive pin geometries as desired (e.g., utilizing a stepped geometry rather than a single surface).

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A sonotrode configured for use in an ultrasonic welding system comprising:

a body portion terminating at a tip portion, the tip portion including (i) an annular alignment feature and (ii) a working surface configured to press against a base portion of a conductive pin during an ultrasonic welding process, and the tip portion defining an outer portion between the annular alignment feature and an outer edge of the tip portion, the working surface defining an aperture configured to receive an elongate portion of the conductive pin, and the annular alignment feature being configured to align the conductive pin with respect to the aperture, and the annular alignment feature including a plurality of tapered portions extending between the working surface and the outer portion, wherein depressions are defined between the plurality of tapered portions and each of the plurality of depressions extends from the outer portion to the working surface.

2. The sonotrode of claim 1 wherein a plurality of protrusions extend from a planar portion of the working surface.

3. The sonotrode of claim 2 wherein the plurality of protrusions are arranged radially between the aperture and the annular alignment feature.

4. The sonotrode of claim 2 wherein ones of the plurality of protrusions are offset from adjacent ones of the plurality of protrusions.

5. The sonotrode of claim 1 wherein a plurality of grooves are defined by a planar portion of the working surface.

6. The sonotrode of claim 5 wherein the plurality of grooves are arranged radially between the aperture and the alignment feature.

7. The sonotrode of claim 5 wherein ones of the plurality of grooves are offset from adjacent ones of the plurality of grooves.

8. The sonotrode of claim 1 wherein (i) the alignment feature is configured to contact the base portion of the conductive pin when the conductive pin is picked up by the sonotrode, and then (ii) the alignment feature aligns the conductive pin with respect to the aperture, and then (iii) the working surface contacts the base portion of the conductive pin during the ultrasonic welding process.

9. The sonotrode of claim 8 wherein the conductive pin is picked up by the sonotrode using a vacuum source, and wherein the vacuum source assists in aligning of the conductive pin with respect to the aperture.

10. The sonotrode of claim 1 wherein the alignment feature is configured to center the conductive pin with respect to the aperture during alignment.

11. An ultrasonic welding system including:

a support structure for supporting a workpiece; and a weld head assembly including an ultrasonic converter carrying a sonotrode configured for use in the ultrasonic welding system, the sonotrode including a body portion terminating at a tip portion, the tip portion including (i) an annular alignment feature and (ii) a working surface configured to press against a base portion of a conductive pin during an ultrasonic welding process, and the tip portion defining an outer portion between the annular alignment feature and an outer edge of the tip portion, the working surface defining an aperture configured to receive an elongate portion of the conductive pin, and the annular alignment feature being configured to align the conductive pin with respect to the aperture, and the annular alignment feature including a plurality of tapered portions extending between the working surface and the outer portion, wherein depressions are defined between the plurality of tapered portions and each of the plurality of depressions extends from the outer portion to the working surface.

12. The ultrasonic welding system of claim 11 wherein a plurality of protrusions extend from a planar portion of the working surface.

13. The ultrasonic welding system of claim 12 wherein the plurality of protrusions are arranged radially between the aperture and the annular alignment feature.

14. The ultrasonic welding system of claim 12 wherein ones of the plurality of protrusions are offset from adjacent ones of the plurality of protrusions.

15. The ultrasonic welding system of claim 11 wherein a plurality of grooves are defined by a planar portion of the working surface.

16. The ultrasonic welding system of claim 15 wherein the plurality of grooves are arranged radially between the aperture and the alignment feature.

17. The ultrasonic welding system of claim 15 wherein ones of the plurality of grooves are offset from adjacent ones of the plurality of grooves.

18. The ultrasonic welding system of claim 11 wherein (i) the alignment feature is configured to contact the base portion of the conductive pin when the conductive pin is picked up by the sonotrode, and then (ii) the alignment feature aligns the conductive pin with respect to the aperture, and then (iii) the working surface contacts the base portion of the conductive pin during the ultrasonic welding process.

19. The ultrasonic welding system of claim 18 wherein the conductive pin is picked up by the sonotrode using a vacuum source, and wherein the vacuum source assists in aligning of the conductive pin with respect to the aperture.

20. The ultrasonic welding system of claim 11 wherein the alignment feature is configured to center the conductive pin with respect to the aperture during alignment.

21. A method of operating an ultrasonic welding system comprising the steps of:

(a) providing a conductive pin to a sonotrode of the ultrasonic welding system, the sonotrode including a body portion terminating at a tip portion, the tip portion including (i) an annular alignment feature and (ii) a working surface configured to press against a base portion of the conductive pin during an ultrasonic welding process, and the tip portion defining an outer portion between the annular alignment feature and an outer edge of the tip portion, and the annular alignment feature including a plurality of tapered portions extending between the working surface and the outer portion, wherein depressions are defined between the plurality of tapered portions and each of the plurality of depressions extends from the outer portion to the working surface; and (b) aligning the conductive pin with respect to an aperture defined by the sonotrode using the annular alignment feature.

* * * * *